United States Patent
Zhang et al.

(10) Patent No.: US 11,049,334 B2
(45) Date of Patent: Jun. 29, 2021

(54) PICTURE-BASED VEHICLE LOSS ASSESSMENT

(71) Applicant: Advanced New Technologies Co., Ltd., George Town (KY)

(72) Inventors: Haitao Zhang, Hangzhou (CN); Juan Xu, Beijing (CN); Jinlong Hou, Hangzhou (CN); Jian Wang, Beijing (CN); Xin Guo, Hangzhou (CN); Danni Cheng, Hangzhou (CN); Yue Hu, Hangzhou (CN); Bokun Wu, Hangzhou (CN); Yanqing Chen, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 621 days.

(21) Appl. No.: 15/950,723

(22) Filed: Apr. 11, 2018

(65) Prior Publication Data
US 2018/0293806 A1 Oct. 11, 2018

(30) Foreign Application Priority Data
Apr. 11, 2017 (CN) .......................... 201710233656.1

(51) Int. Cl.
*G07C 5/00* (2006.01)
*G06N 3/063* (2006.01)
(Continued)

(52) U.S. Cl.
CPC ......... *G07C 5/006* (2013.01); *G06K 9/00664* (2013.01); *G06K 9/3233* (2013.01);
(Continued)

(58) Field of Classification Search
CPC .......... G07C 5/006; G07C 5/008; G06T 7/75; G06T 7/0008; G06K 9/6218; G06K 9/6268; G06N 3/063; G06Q 10/20; G06Q 40/08
(Continued)

(56) References Cited

U.S. PATENT DOCUMENTS 6,246,954 B1 6/2001 Berstis et al.
6,826,301 B2 11/2004 Glickman
(Continued)

FOREIGN PATENT DOCUMENTS

CN 1658559 8/2005
CN 102376071 3/2012
(Continued)

OTHER PUBLICATIONS

S. Ren, K. He, R. Girshick and J. Sun, "Faster R-CNN: Towards Real-Time Object Detection with Region Proposal Networks," in IEEE Transactions on Pattern Analysis and Machine Intelligence, vol. 39, No. 6, pp. 1137-1149, Jun. 1, 2017, doi: 10.1109/TPAMI.2016.2577031. (Year: 2016).*
(Continued)

*Primary Examiner* — Isaac G Smith
(74) *Attorney, Agent, or Firm* — Fish & Richardson P.C.

(57) ABSTRACT

Methods, systems, and computer-readable storage media for generation of a vehicle repair plan. Implementations include actions of receiving vehicle damage data including an image of a damaged vehicle. The vehicle damage data is processed to determine a component region. The component region is processed to determine a damaged area and a damage type of a portion of the damaged vehicle. A maintenance plan is generated for the damaged vehicle based on the damaged area and the damage type. The maintenance plan is initiated for the damaged vehicle.

20 Claims, 9 Drawing Sheets

(51) Int. Cl.

| | | |
|---|---|---|
| *G06K 9/62* | (2006.01) | |
| *G06T 7/00* | (2017.01) | |
| *G06Q 10/00* | (2012.01) | |
| *G06Q 40/08* | (2012.01) | |
| *G06K 9/00* | (2006.01) | |
| *G06K 9/46* | (2006.01) | |
| *G06N 5/00* | (2006.01) | |
| *G06N 3/04* | (2006.01) | |
| *G06N 20/20* | (2019.01) | |
| *G06N 3/08* | (2006.01) | |
| *G06Q 10/06* | (2012.01) | |
| *G06T 7/73* | (2017.01) | |
| *G06K 9/32* | (2006.01) | |

(52) U.S. Cl.
CPC ......... *G06K 9/4628* (2013.01); *G06K 9/6218* (2013.01); *G06K 9/6268* (2013.01); *G06K 9/6271* (2013.01); *G06N 3/0454* (2013.01); *G06N 3/063* (2013.01); *G06N 3/08* (2013.01); *G06N 5/003* (2013.01); *G06N 20/20* (2019.01); *G06Q 10/06313* (2013.01); *G06Q 10/06395* (2013.01); *G06Q 10/20* (2013.01); *G06Q 40/08* (2013.01); *G06T 7/0002* (2013.01); *G06T 7/0008* (2013.01); *G06T 7/75* (2017.01); *G07C 5/008* (2013.01); *G06K 9/628* (2013.01); *G06T 2207/20081* (2013.01); *G06T 2207/20084* (2013.01); *G06T 2207/30156* (2013.01)

(58) Field of Classification Search
USPC ................................................ 701/31.4, 31.5
See application file for complete search history.

(56) References Cited

U.S. PATENT DOCUMENTS

| | | | |
|---|---|---|---|
| 6,969,809 | B2 | 11/2005 | Rainey |
| 7,889,931 | B2 | 2/2011 | Webb et al. |
| 8,510,196 | B1 | 8/2013 | Brandmaier et al. |
| 8,515,152 | B2 | 8/2013 | Siri |
| 8,712,893 | B1 | 4/2014 | Brandmaier et al. |
| 9,262,789 | B1 | 2/2016 | Tofte |
| 9,307,234 | B1 | 4/2016 | Greiner et al. |
| 9,489,696 | B1 | 11/2016 | Tofte |
| 9,870,609 | B2 | 1/2018 | Kompalli et al. |
| 9,886,771 | B1* | 2/2018 | Chen ................... G06F 3/04845 |
| 10,580,075 | B1 | 3/2020 | Brandmaier et al. |
| 10,657,707 | B1* | 5/2020 | Leise ...................... G06T 17/00 |
| 2002/0007289 | A1 | 1/2002 | Malin et al. |
| 2004/0113783 | A1 | 6/2004 | Yagesh |
| 2004/0183673 | A1 | 9/2004 | Nageli |
| 2005/0108065 | A1 | 5/2005 | Dorfstatter |
| 2006/0103568 | A1 | 5/2006 | Powell et al. |
| 2006/0114531 | A1 | 6/2006 | Webb et al. |
| 2006/0124377 | A1 | 6/2006 | Lichtinger et al. |
| 2006/0267799 | A1 | 11/2006 | Mendelson |
| 2007/0164862 | A1 | 7/2007 | Dhanjal et al. |
| 2008/0255887 | A1 | 10/2008 | Gruter |
| 2008/0267487 | A1* | 10/2008 | Siri .......................... G06Q 90/00 382/141 |
| 2008/0281658 | A1 | 11/2008 | Siessrnan |
| 2009/0033540 | A1 | 2/2009 | Breed et al. |
| 2009/0256736 | A1 | 10/2009 | Orr |
| 2010/0067420 | A1 | 3/2010 | Twitchell, Jr. |
| 2010/0073194 | A1 | 3/2010 | Ghazarian |
| 2010/0100319 | A1 | 4/2010 | Trinko et al. |
| 2010/0106413 | A1 | 4/2010 | Mudalige |
| 2010/0265104 | A1 | 10/2010 | Zlojutro |
| 2010/0265325 | A1 | 10/2010 | Lo et al. |
| 2010/0271196 | A1 | 10/2010 | Schmitt et al. |
| 2011/0068954 | A1 | 3/2011 | McQuade et al. |
| 2011/0102232 | A1 | 5/2011 | Orr et al. |
| 2012/0029759 | A1 | 2/2012 | Suh et al. |
| 2012/0029764 | A1 | 2/2012 | Payne et al. |
| 2012/0062395 | A1 | 3/2012 | Sonnabend et al. |
| 2014/0229207 | A1* | 8/2014 | Swamy ................. G06Q 40/08 705/4 |
| 2014/0309805 | A1 | 10/2014 | Ricci |
| 2015/0287130 | A1 | 10/2015 | Vercollone et al. |
| 2016/0239922 | A1 | 8/2016 | Jimenez |
| 2017/0011294 | A1* | 1/2017 | Jagannathan ......... G06F 9/3887 |
| 2017/0293894 | A1 | 10/2017 | Taliwal |
| 2018/0040039 | A1* | 2/2018 | Wells ................. G06Q 30/0283 |
| 2018/0182039 | A1* | 6/2018 | Wang ................... G06K 9/6268 |
| 2018/0189949 | A1 | 7/2018 | Lapiere et al. |
| 2018/0197048 | A1* | 7/2018 | Micks ................. H04N 13/275 |
| 2018/0260793 | A1 | 9/2018 | Li et al. |
| 2018/0293552 | A1 | 10/2018 | Zhang et al. |
| 2018/0293664 | A1 | 10/2018 | Zhang et al. |
| 2018/0300576 | A1* | 10/2018 | Dalyac ................. G06K 9/3241 |
| 2019/0213563 | A1 | 7/2019 | Zhang et al. |
| 2019/0213689 | A1 | 7/2019 | Zhang et al. |
| 2019/0213804 | A1 | 7/2019 | Zhang et al. |

FOREIGN PATENT DOCUMENTS

| | | |
|---|---|---|
| CN | 103310223 | 9/2013 |
| CN | 104268783 | 1/2015 |
| CN | 104517442 | 4/2015 |
| CN | 105488576 | 4/2016 |
| CN | 105488789 | 4/2016 |
| CN | 105678622 | 6/2016 |
| CN | 105719188 | 6/2016 |
| CN | 105956667 | 9/2016 |
| CN | 106021548 | 10/2016 |
| CN | 106022929 | 10/2016 |
| CN | 106056451 | 10/2016 |
| CN | 106127747 | 11/2016 |
| CN | 106203644 | 12/2016 |
| CN | 106250812 | 12/2016 |
| CN | 106296118 | 1/2017 |
| CN | 106296126 | 1/2017 |
| CN | 106370128 | 2/2017 |
| CN | 106372651 | 2/2017 |
| CN | 106504248 | 3/2017 |
| JP | H 0778022 | 3/1995 |
| JP | H0981739 | 3/1997 |
| JP | 2001344463 | 12/2001 |
| JP | 2002183338 | 6/2002 |
| JP | 2003132170 | 5/2003 |
| JP | 2003170817 | 6/2003 |
| JP | 2003196511 | 7/2003 |
| JP | 2003226230 | 8/2003 |
| JP | 2003346021 | 12/2003 |
| JP | 2005107722 | 4/2005 |
| JP | 2006164022 | 6/2006 |
| JP | 3839822 | 11/2006 |
| JP | 2011215973 | 10/2011 |
| JP | 5321784 | 12/2013 |
| JP | 2015184143 | 10/2015 |
| JP | 2017062776 | 3/2017 |
| JP | 2018112999 | 7/2018 |
| JP | 2018537798 | 12/2018 |
| KR | 20160018944 | 2/2016 |
| KR | 20160019514 | 2/2016 |
| KR | 20170016778 | 2/2017 |
| TW | M478859 | 5/2014 |
| WO | 2005109263 | 11/2005 |
| WO | WO 2013093932 | 6/2013 |
| WO | WO 2017055878 | 4/2017 |

OTHER PUBLICATIONS

F. M. Rodrigues, C. J. Câmara, A. M. P. Canuto and A. M. Santos, "Confidence factor and feature selection for semi-supervised multi-label classification methods," 2014 International Joint Conference on Neural Networks (IJCNN), Beijing, 2014, pp. 864-871, doi: 10.1109/IJCNN.2014.6889564. (Year: 2014).*

(56) References Cited

OTHER PUBLICATIONS

International Search Report arid Written Opinion of the International Searching Authority issued in International Application No. PCT/US2018/027174 dated Jun. 21, 2018; 6 pages.
Shaoqing et al.; "Faster R-CNN: Towards real-Time Object Detection With Region Proposal Networks"; IEEE Transactions on Pattern Analysis and Machine Intelligence; Jan. 6, 2016.
International Preliminary Report on Patentability Chapter II in International Application No. PCT/US2018/027174, dated Jun. 4, 2019, 25 pages.
International Preliminary Report on Patentability Chapter II in International Application No. PCT/US2018/027192, dated Jun. 4, 2019, 20 pages.
International Preliminary Report on Patentability Chapter II in International Application No. PCT/US2018/027194, dated Jun. 4, 2019, 24 pages.
Ren et al. "Faster R-CNN: Towards real-Time Object Detection With Region Proposal Networks"; IEEE Transactions on Pattern Analysis and Machine Intelligence; 2017, 39(6):1137-1149.
Database WPI, XP002781821, Week 201644, Thomson Scientific, London GB, AN 2016-38589L, corresponding to CN 105678622, 2017, 1 page.
Database WPI, XP002781822, Week 201714, Thomson Scientific, London GB, AN 2017-10178Y, corresponding to CN 106372651, 2017, 1 page.
International Search Report and Written Opinion in International Application No. PCT/US2018/027192, dated Jun. 20, 2018; 15 pages.
International Search Report and Written Opinion in International Application No. PCT/US2018/027194, dated Jun. 26, 2018; 15 pages.
Second Written Opinion in International Application No. PCT/US2018/027174, dated Mar. 8, 2019, 7 pages.
Second Written Opinion in International Application No. PCT/US2018/027192, dated Mar. 13, 2019, 7 pages.
Second Written Opinion in International Application No. PCT/US2018/027194, dated Mar. 13, 2019, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Wang, "Structural Damage Monitoring Based on Vibration Modal Analysis and Neural Network Technique," China Master's Theses Full-Text Database Information Technology, Jan. 2004, 91 pages (with English abstract).
Deng, Accident Prediction, Prevention and Rescue in Intelligent Transport System (ITS), Chinese Master's Theses Full-text Database, Dec. 2014, pp. 1-64 (with English abstract).
Ma et al., "Comparative Study on the Service Models of Auto Insurance Claims in China and Foreign Countries," Pioneering with Science and Technology Monthly, Nov. 2012, 11:47-48 (with English abstract).
Yongming et al., "Research on honeycomb sandwich composite structure damage detection based on matching pursuit method," Chinese Journal of Scientific Instrument, 2012, 33(4):836-842 (with English abstract).

\* cited by examiner

PICTURE-BASED VEHICLE LOSS ASSESSMENT

This application claims priority to Chinese Patent Application No. 201710233656.1, filed on Apr. 11, 2017, which is hereby incorporated by reference in its entirety.

TECHNICAL FIELD

The present application relates to the field of computer image data processing technologies, and in particular, to a picture-based vehicle loss assessment method and apparatus, and an electronic device.

BACKGROUND

When a traffic accident occurs, it is often necessary to wait for a claims adjuster for an insurance company to go to the accident scene to process and acquire a claims basis by photographing, etc. With the increase in motor vehicle ownership in recent years, the number of annual traffic accidents has been at a high level. However, vehicle loss assessment claims service processing often depends on human on-scene processing of professional insurance staff, which is featured by high costs, a long waiting period, and low processing efficiency.

Currently, there are some processing methods in which traffic accident scene pictures are automatically analyzed to obtain predetermined classifications of predetermined auto damage parts. For example, an invention with a publication number "CN105678622A" entitled "ANALYSIS METHOD AND SYSTEM FOR VEHICLE INSURANCE CLAIMS SETTLEMENT PHOTOS" discloses an algorithm of using a conventional convolutional neural network (CNN) to analyze claims settlement photos uploaded by a mobile terminal to identify damaged part classifications, and generate notification information based on the analysis result. However, the foregoing method is merely determining classifications of vehicle damaged parts, such as the front, the side, or the rear of the car. No specific damage type is identified.

SUMMARY

The present application aims to provide a picture-based vehicle loss assessment method and apparatus, and an electronic device, to quickly, accurately, and reliably identify specific information about a damaged part and a degree of a vehicle component. A result of the loss assessment can be more accurate and reliable. Information about a maintenance plan can be provided to a user for fast and efficient vehicle loss assessment processing, so as to greatly improve user experience.

The picture-based vehicle loss assessment method and apparatus, and the electronic device provided in the present application are implemented as follows:

A picture-based vehicle loss assessment method is provided, and the method includes: acquiring a to-be-processed picture for vehicle loss assessment; examining the to-be-processed picture by using a constructed component identification model, identifying a vehicle component in the to-be-processed picture, and determining a component region of the vehicle component in the to-be-processed picture; examining the to-be-processed picture by using a constructed damage identification model, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

A picture-based vehicle loss assessment apparatus is provided, and the apparatus includes: a picture acquiring module, configured to acquire a to-be-processed picture for vehicle loss assessment; a first identification module, configured to: examine the to-be-processed picture by using a constructed component identification model, identify a vehicle component in the to-be-processed picture, and determine a component region of the vehicle component in the to-be-processed picture; a second identification module, configured to: examine the to-be-processed picture by using a constructed damage identification model, and identify a damaged part and a damage type in the to-be-processed picture; a damage calculation module, configured to: determine a damaged component in the to-be-processed picture based on a processing result of the first identification module and a processing result of the second identification module, and determine a damaged part and a damage type of the damaged component; and a loss assessment processing module, configured to: generate a maintenance plan based on information including the damaged component, the damaged part, and the damage type.

A picture-based vehicle loss assessment apparatus is provided, including a processor and a memory configured to store a processor executable instruction, where when executing the instruction, the processor implements: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

A computer-readable storage medium is provided, where the computer-readable storage medium stores a computer instruction, and when the instruction is executed, the following steps are implemented: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

An electronic device is provided, including a processor and a memory configured to store a processor executable instruction, where when executing the instruction, the processor implements: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

According to the picture-based vehicle loss assessment method and apparatus, and the electronic device provided in the present application, the damaged component included in the to-be-processed picture can be identified, and the damaged part of the damaged component and the damage type corresponding to each damaged part can then be identified based on the constructed damage identification model. Therefore, vehicle loss assessment information of the vehicle component can be accurately, comprehensively, and reliably obtained. Further, the maintenance plan is generated for the vehicle based on the information including the damaged component, the damaged part of the damaged component, the damage type, and the maintenance strategy in the embodiments of the present application, to provide more accurate and reliable loss assessment information with practical reference value for an insurance claim operator and a vehicle owner user. In the embodiments of the present application, one or more damaged components in one or more pictures, one or more damaged parts in the damaged components, and one or more damage degrees can be identified to quickly obtain more comprehensive and accurate loss assessment information. Then, the maintenance plan can be automatically generated, to satisfy a requirement of the insurance company or the vehicle owner user for fast, comprehensive, accurate, and reliable vehicle loss assessment processing, improving the accuracy and reliability of a result of the vehicle loss assessment processing, and improving user experience.

BRIEF DESCRIPTION OF DRAWINGS

To describe technical solutions in embodiments of the present application more clearly, the following briefly introduces the accompanying drawings required for describing the embodiments. The accompanying drawings in the following description merely show some embodiments of the present application, and a person of ordinary skill in the art may still derive other drawings from these accompanying drawings without creative efforts.

DESCRIPTION OF EMBODIMENTS

To make a person skilled in the art better understand the technical solutions in the present application, the technical solutions in the embodiments of the present application are clearly and completely described in the following with reference to the accompanying drawings in the embodiments of the present application. The described embodiments are merely some rather than all of the embodiments of the present application. All other embodiments obtained by a person of ordinary skill in the art based on the embodiments of the present application without creative efforts shall fall within the protection scope of the present application.

Figure 1:
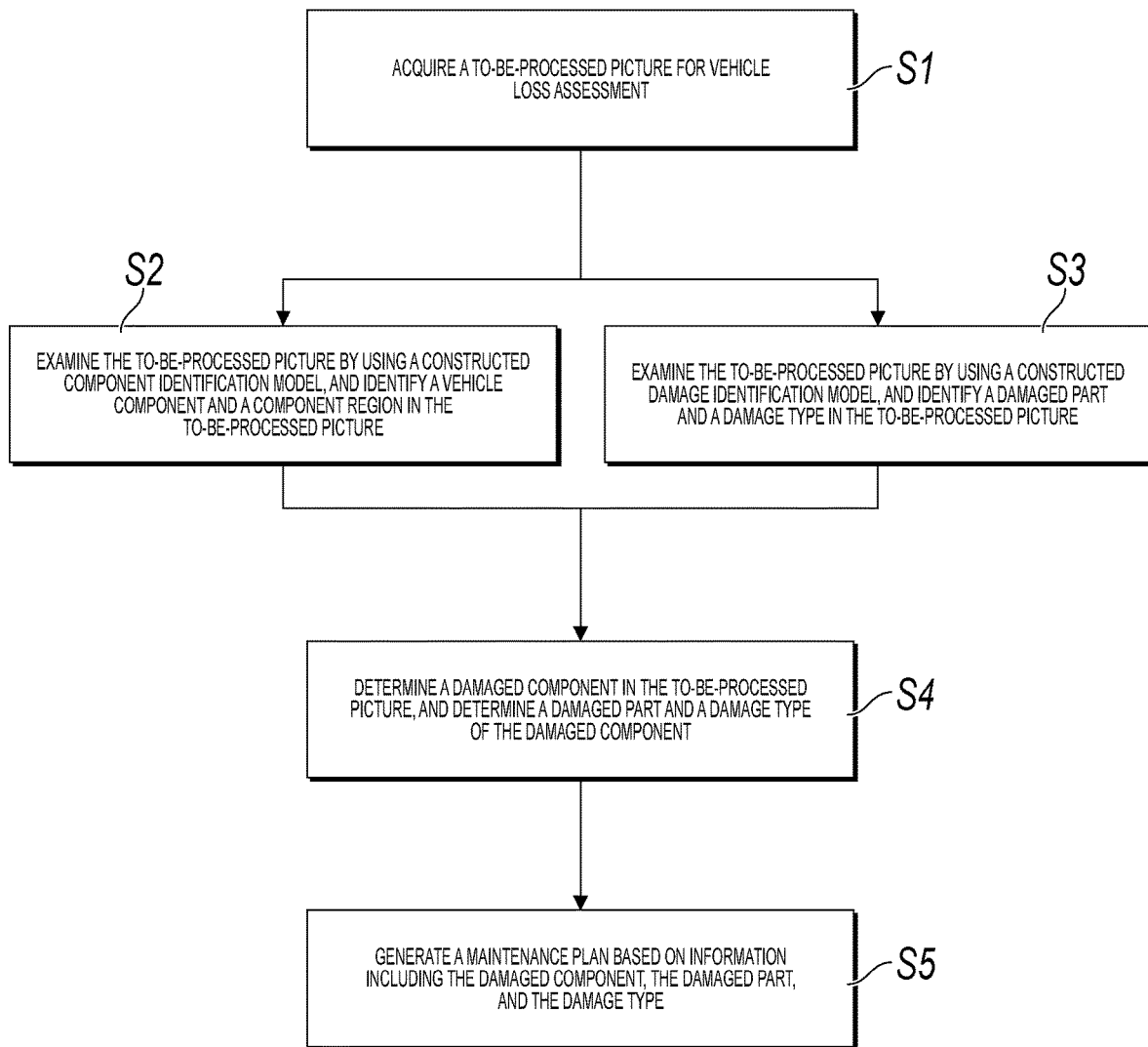
FIG. 1 is a schematic method flowchart illustrating a picture-based vehicle loss assessment method according to an embodiment of the present application.

FIG. 1 is a schematic method flowchart illustrating a picture-based vehicle loss assessment method according to an embodiment of the present application. The present application provides operational steps in a method or a structure of an apparatus shown in the following embodiments or accompanying drawings. However, conventionally or without creative efforts, the method can include more operational steps, or fewer operational steps after partial combination, or the apparatus can include more modules units, or fewer modules units after partial combination. For steps or structures that do not logically have the necessary causal relationships, the order of execution of these steps, or the module structure of the device is not limited to the execution order or module structure shown in the embodiments or the accompanying drawings of the present application. When the method or the module structure is applied to an actual apparatus, a server, or a terminal product, the method or the module structure can be sequentially executed or executed in parallel according to the method or the module structure shown in the embodiments or the accompanying drawings (for example, an environment of parallel processors or multithreaded processing, even including an implementation environment of distributed processing or server clustering).

Currently, when an actual traffic accident is processed, for example, a scratch accident, it is usually necessary to wait for an insurance company's claims adjuster to come to cite and take pictures of the scene before evacuating the scene, thus often causing traffic congestion and wasting a lot of time and prolonging the waiting period of obtaining the damage assessment result information. However, according to the embodiments of the present application, when a traffic accident occurs, an involved vehicle owner can take photos of the accident scene if they want to know the loss or the damage assessment status of their own vehicle or the vehicle of the other involved vehicle owner. In addition to serving as evidence for the accident scene, the photos can be further used for automatic vehicle loss assessment and claims status access through a terminal APP (application). Therefore, the involved vehicle owner user can quickly, comprehensively, accurately, and reliably get vehicle loss assessment processing.

For clarity, the following embodiments describe a specific application scenario in which a vehicle owner user uses a mobile terminal APP to request a vehicle loss assessment service. In the application scenario of the embodiments, the vehicle owner user can take photos for a damaged vehicle part and an entire vehicle by using a mobile terminal (for example, a mobile phone) at a traffic accident scene. In some situations, the vehicle owner user can further take photos for a vehicle license, a user identity, etc. Afterwards, the vehicle owner user uploads the photographed photos (pictures, images) through the terminal application. After acquiring the to-be-processed pictures for vehicle loss assessment, a cloud server can first identify damaged components, one or more damaged parts of the damaged components, and corresponding damage types. Then, a rule engine can be designed to invoke different price databases based on maintenance strategy information such as a vehicle model, a location, a repair shop, etc., and ultimately generate at least one maintenance plan. The maintenance plan can be returned to the vehicle owner user, so that the vehicle owner user can quickly acquire a result of vehicle loss assessment. Certainly, if the user is an insurance company staff, the user can return the maintenance plan to the insurance company or directly display the result of the maintenance plan. However, a person skilled in the art can understand that the essence of the present solution can be applied to other implementation scenarios of vehicle loss assessment, for example, automatic vehicle loss assessment of the insurance company or the repair shop, or self-help vehicle loss assessment service provided by authorized dealerships or other servers.

A specific embodiment is shown in FIG. 1. The present application provides an embodiment of a picture-based vehicle loss assessment method. The method can include the following steps:

S1. Acquire a to-be-processed picture for vehicle loss assessment.

A server can acquire a to-be-processed picture of a vehicle from a client or a third-party server (for example, a server of an insurance company). The to-be-processed picture usually includes picture information captured by the user that includes the position of the vehicle, and can also include picture information of a vehicle license, a user identity, and a surrounding environment (a signal light, a landmark, etc.) uploaded by the user. The to-be-processed picture in this embodiment may include various graphics and photos, which generally is an image with a visual effect that can include a picture on a piece of paper, a picture on a film or a photo, a picture on a TV, a picture projected by a projector, a picture on a computer screen, etc.

In an optional embodiment, it can further be determined whether the picture quality of the to-be-processed picture meets a predetermined processing requirement. If the picture quality is relatively poor, for example, if the picture is too fuzzy to be identified, the component picture can be discarded, and feedback is sent to the mobile terminal APP to prompt the user to pay attention to factors that affect the clarity such as the focus and the lighting. The picture quality may be determined based on a fuzzy degree threshold, an information entropy value, etc.

S2: Examine the to-be-processed picture by using a constructed component identification model, identify a vehicle component in the to-be-processed picture, and determine a component region of the vehicle component in the to-be-processed picture.

In a scenario of this embodiment, after acquiring the to-be-processed picture, a cloud server can examine the to-be-processed picture by using a pre-constructed component identification model to identify the vehicle component included in the to-be-processed picture. If it is identified that one to-be-processed picture includes one or more vehicle components, information about position regions of the vehicle components in the to-be-processed picture (which can be referred to as a component region herein) is further determined through calculation. The vehicle components described in this embodiment generally mean components on a vehicle, such as a front bumper, a front left door, and a tail lamp.

In this embodiment, the component identification model used to identify a vehicle component in a picture can be constructed in advance by using a designed machine learning algorithm. After the component identification model is trained on sample pictures, it can identify which vehicle components are contained in the component picture. In this embodiment, a network model of a deep neural network or a variant network model can be trained by using sample pictures, to construct the component identification model. In another embodiment of the method provided in the present application, the component identification model can be constructed based on a convolutional neural network (CNN) and a region proposal network (RPN) with reference to a fully connected layer and damage sample pictures trained by an input model. Therefore, in another embodiment of the method in the present application, the component identification model includes:

S201. A deep neural network that is based on a network model of a convolution layer and a region proposal layer constructed after training based on sample data.

A convolutional neural network generally refers to a neural network that is mainly composed of a convolution layer (CNN) and other structures such as an activation layer, and is mainly used for picture identification. The deep neural network described in this embodiment can include a convolution layer, and other important layers (such as damage sample pictures trained by an input model, several normalized layers, and an activation layer), and establish a network together with the region proposal network. The convolutional neural network usually combines two-dimensional discrete convolution operations in image processing with an artificial neural network. The convolution operation can be used for automatic feature extraction. A feature (which can be a two-dimensional feature extracted by using the convolutional neural network) extracted from a picture (in any size) can be input to the region proposal network (RPN), and the region proposal network outputs a set of rectangular target proposal boxes. Each box includes a score of one object. To avoid confusion, in this embodiment, the convolutional neural network (CNN) can be referred to as a convolution layer (CNN), and the region proposal network (RPN) can be referred to as a region proposal layer (RPN). In other embodiments of the present application, the component identification model may further include an improved modified network model based on the convolutional neural network or the regional proposal network, and a deep convolutional neural network constructed and generated through sample data training.

The models and the algorithms used in the foregoing embodiment can be models or algorithm of a same type. Specifically, for example, various models and variants based on the convolutional neural network and the region proposal network can be applied to the component identification model, such as Faster R-CNN, YOLO, and Mask-FCN. The convolutional neural network (CNN) can use any CNN model, such as ResNet, Inception, VGG, and a variant thereof. Generally, a convolutional network (CNN) part in the neural network can use a mature network structure that functions well in object identification, such as the Inception network and the ResNet network. For example, in the ResNet network, when input is a picture, the output can be a plurality of component regions, and their corresponding component classifications and confidence levels (the confidence level herein is a parameter indicating a degree of authenticity of the identified vehicle component). Multiple deep neural networks (e.g., R-CNN, YOLO, Mask-FCN, etc.) include a convolution layer and can be applied to the described embodiment. The deep neural network used in the current embodiment can identify the vehicle component in the to-be-processed picture with reference to the region proposal layer and the CNN layer, and determine the component region of the vehicle component in the to-be-processed picture.

It should be noted that in an implementation of the present application, a separate algorithm server can be used to implement the component identification model to examine the to-be-processed picture and identify the vehicle component in the to-be-processed picture. For example, a business server is set up to acquire a to-be-processed picture uploaded by a user, and output a maintenance plan. An algorithm server can be further disposed to store a constructed component identification model, examine and identify the to-be-processed picture of the business server, and determine a vehicle component in the to-be-processed picture. In some implementations, the foregoing processing can also be executed by the same server.

S3. Examine the to-be-processed picture by using a constructed damage identification model, and identify a damaged part and a damage type in the to-be-processed picture.

After acquiring the to-be-processed picture, a cloud server can examine the component picture by using the pre-constructed damage identification model, to identify the damaged part and the damage type in the to-be-processed picture. The damaged part in this embodiment generally refers to a part that is damaged on the vehicle. A damaged vehicle component can contain a plurality of damaged parts, and each damaged part corresponds to a damage type (for example, a severe scratch, mild deformation, etc.). In this embodiment, the position region of the damaged part in the to-be-processed picture (the position region can be referred to as the damage region that can be understood as picture region data of a specific damage region corresponding to a damaged part, or the damage region is expressed as entity data information of the damaged part) can be identified, and the damage region can be examined to identify the damage type. The damage type described in this embodiment may include a mild scratch, a severe scratch, mild deformation, moderate deformation, severe deformation, damage, and in need of disassembling for an examination.

In this embodiment, the damage identification model used to identify the damaged part and the damage type included in the picture can be constructed in advance by using the designed machine learning algorithm. After sample training, the damage identification model can identify one or more damaged parts in the to-be-processed picture and the corresponding damage type. In this embodiment, the network model of the deep neural network or the variant network model can be trained based on samples, to construct the damage identification model. In another embodiment of the method provided in the present application, the damage identification model can be constructed based on the convolutional neural network (CNN) and the region proposal network (RPN) with reference to a fully connected layer and damage sample pictures trained by an input model. Therefore, in another embodiment of the method in the present application, the damage identification model includes:

S301. A deep neural network that is based on a network model of a convolution layer and a region proposal layer and constructed after training based on sample data.

The convolutional neural network generally refers to a neural network that is mainly composed of a convolution layer (CNN) and other structures such as an activation layer, and is mainly used for picture identification. The deep neural network described in this embodiment can include a convolution layer, and other important layers (such as damage sample pictures trained by an input model, several normalized layers, and an activation layer), and establish a network together with the region proposal network (RPN). The convolutional neural network usually combines two-dimensional discrete convolution operations in image processing with an artificial neural network. The convolution operation can be used for automatic feature extraction. A feature (which can be a two-dimensional feature extracted by using the convolutional neural network) extracted from a picture (in any size) can be input to the region proposal network (RPN), and the region proposal network outputs a set of rectangular target proposal boxes. Each box includes a score of one object. Likewise, to avoid confusion, in this embodiment, the convolutional neural network (CNN) can be referred to as a convolution layer (CNN), and the region proposal network (RPN) can be referred to as a region proposal layer (RPN). In other embodiments of the present application, the damage identification model may further include an improved modified network model based on the convolutional neural network or the regional proposal network, and a deep convolutional neural network constructed and generated through sample data training.

In the foregoing implementation, a plurality of damaged parts in a single damage sample picture can be identified during model training. Specifically, during sample training, the input is a picture, and the output is a plurality of picture regions and corresponding damage types. A selected parameter of the neural network can be obtained through mini-batch gradient descent training by using marking data. For example, when mini-batch=32, 32 training pictures are input for training. The marking data is a picture marked with a region and a corresponding type. The marking data can be obtained by manually marking a real damaged vehicle picture. The input of this neural network is a picture, and the output region is related to a quantity of damaged parts in the picture. Specifically, for example, if there is one damaged part, one picture region is output; if there are k damaged parts, k picture regions are output; or if there is no damaged part, zero picture regions are output.

The models and the algorithms used in the foregoing embodiment can be models or algorithm of a same type. Specifically, for example, various models and variants based on the convolutional neural network and the region proposal network can be applied to the component identification model, such as Faster R-CNN, YOLO, and Mask-FCN. The convolutional neural network (CNN) can use any CNN model, such as ResNet, Inception, VGG, and a variant thereof. Generally, a convolutional network (CNN) part in the neural network can use a mature network structure that functions well in object identification, such as the Inception network and the ResNet network. For example, in the ResNet network, when the input is a picture, the output can be a plurality of picture regions including the damaged part and its corresponding damage classifications (the damage classification is used to determine a damage type), and confidence levels (the confidence level herein is a parameter indicating a degree of authenticity of a damage type). Deep neural networks, such as faster R-CNN, YOLO, Mask-FCN, etc., include a convolution layer and can be applied to the described embodiment. Based on the region proposal layer and the CNN layer, the deep neural network can identify the damaged part, the damage type, and the position region of the damaged part in the component picture.

It should be noted that, in an implementation of the present application, the separate algorithm server can be used to examine the to-be-processed picture, and identify the damaged part and the damage type in the to-be-processed picture. For example, the business server is set up to acquire the to-be-processed picture uploaded by the user and output the maintenance plan. The algorithm server can be further disposed to store the constructed damage identification model, examine and identify the to-be-processed picture of the business server, and determine information such as the damaged part, the damage type, and the damage region included in the to-be-processed picture. Certainly, acquiring the to-be-processed picture and identifying the damaged part, the damage type, and the damage region can also be executed by the same server.

In the foregoing component identification model and the damage identification model, a plurality of types of training data can be used. In an implementation, the component identification model is set to be trained by using a component sample picture including marking data. The component sample picture includes at least one vehicle component.

The damage identification model is set to output at least one damaged part and a damage type corresponding to the damaged part when a damage sample picture is input for model training, and output data information indicating a confidence level for a degree of authenticity of the damage type when the damage identification model is used to examine the to-be-processed picture. During data training, the output of the damage identification model can also include a confidence level, and there will be a confidence level of the model output result when the model is used.

Figure 2:
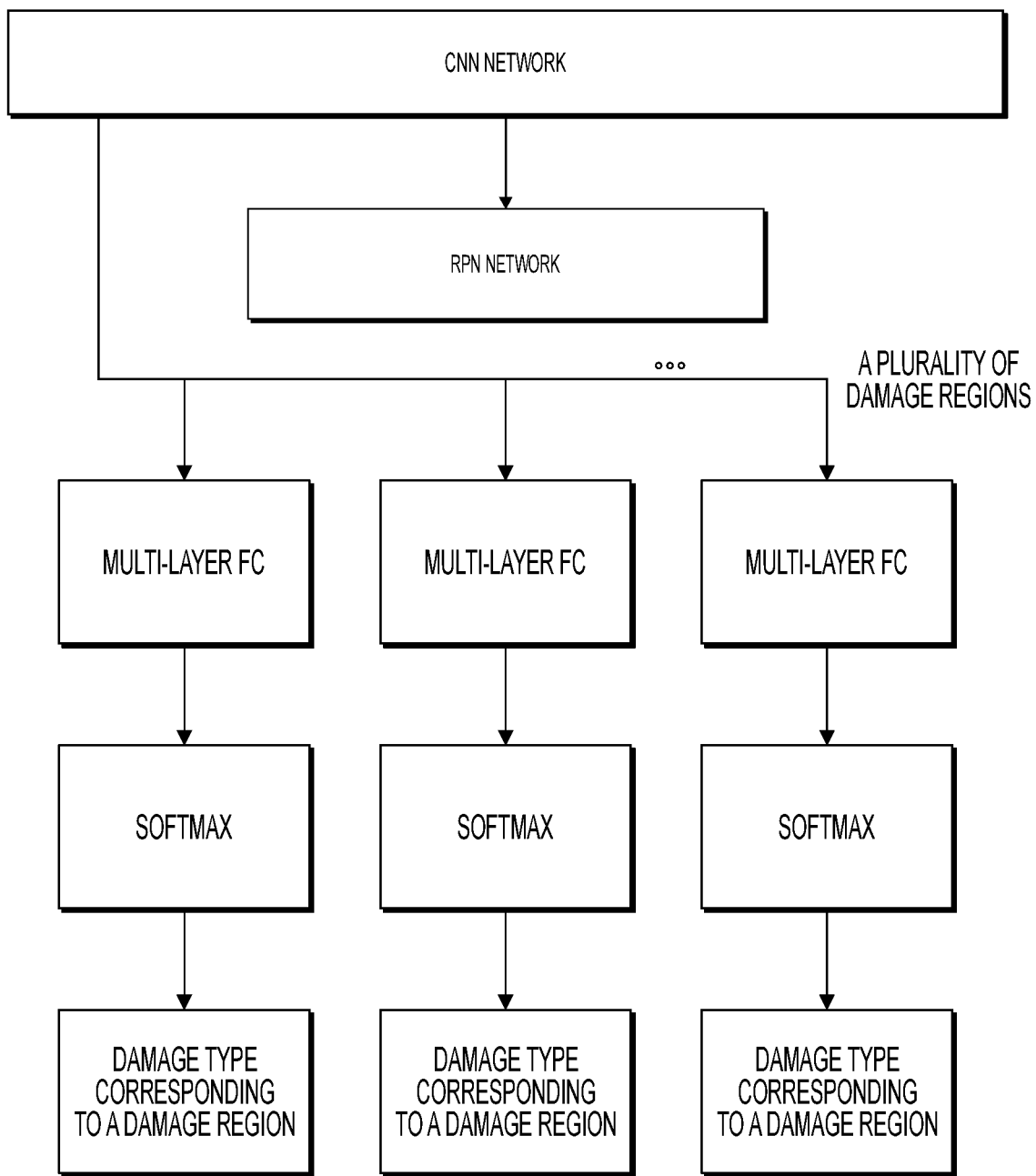
FIG. 2 is a schematic structural diagram illustrating a network architecture of a damage identification model according to an embodiment of the present application.
Figure 3:
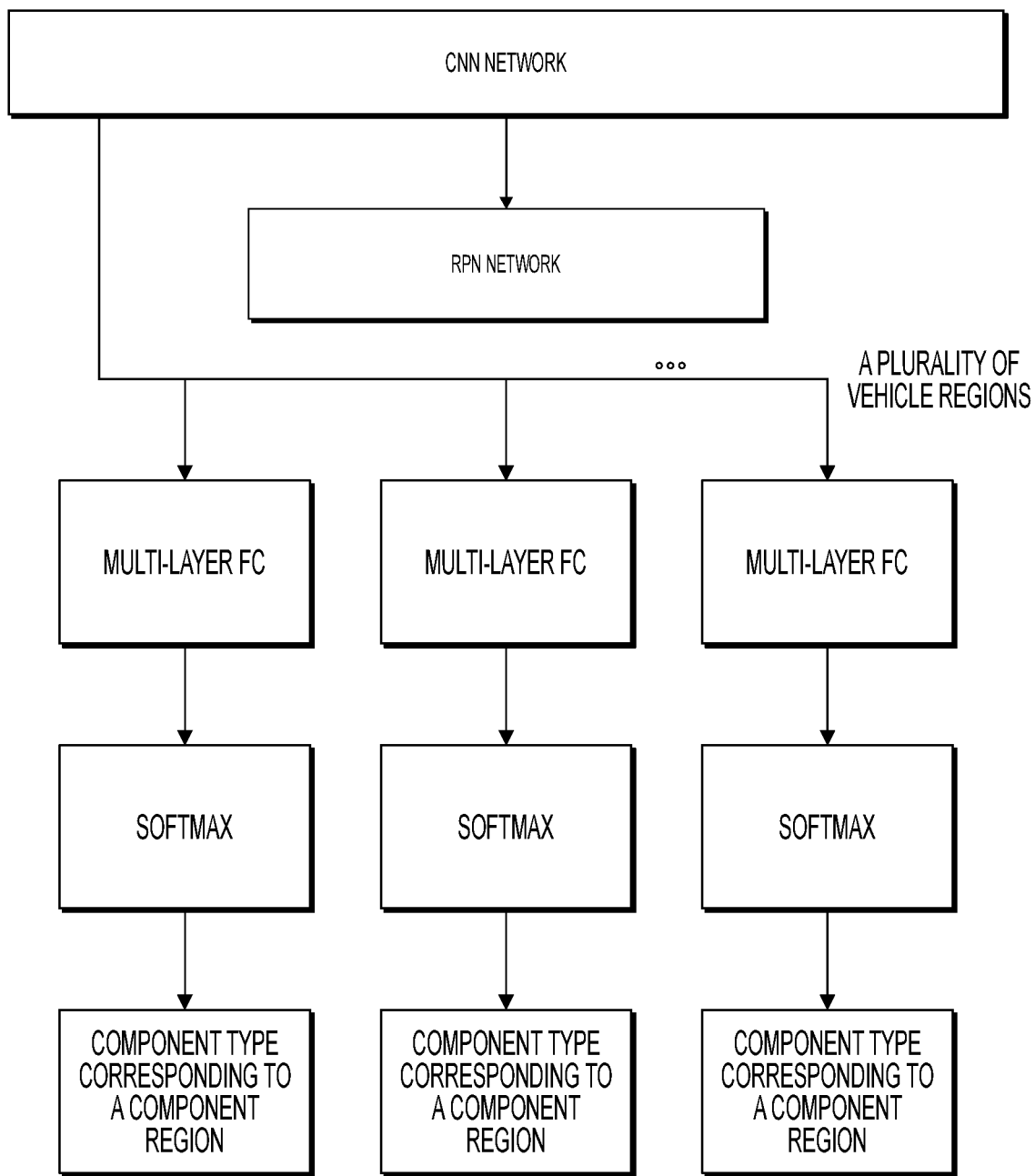
FIG. 3 is a schematic diagram illustrating a network architecture of a component identification model according to an embodiment of the present application.

It should be noted that the process of examining the vehicle component by using the component identification model in S2 and the process of identifying the damaged part, the damage type, and the damage region by using the damage identification model in S3 can be executed in parallel. That is, the same algorithm server or corresponding algorithm servers can be used to process the to-be-processed picture and execute picture processing and calculation in S2 and S3. Certainly, in the present application, it is also feasible to first execute the process of identifying the vehicle component in S2, or first execute the process of identifying the damaged part. As shown in FIG. 2 and FIG. 3, FIG. 2 is a schematic structural diagram illustrating a network architecture of a damage identification model according to an embodiment of the present application, and FIG. 3 is a schematic diagram illustrating a network architecture of a component identification model according to an embodiment of the present application. In an implementation process of an actual terminal APP, the network model architecture of the component identification model is basically the same as the network model architecture of the damage identification model. In the component identification model, the damage region in the damage identification model becomes a component region, and the damage type in the damage identification model becomes a component type. Based on the network model structures shown in FIG. 2 and FIG. 3 in the present application, other improvements, variants, or transformations of a network model can further be included. However, in embodiments of the present application, at least one of the component identification model or the damage identification model is a network model based on a convolution layer and a region proposal layer. An implementation of constructing the deep neural network after the training based on sample data shall fall within the implementation scope of the present application.

S4. Determine a damaged component in the to-be-processed picture according to the damaged part and the component region, and determine a damaged part and a damage type of the damaged component.

After obtaining the vehicle component information included in the to-be-processed picture and information about the damaged part, the damage type, and the damage region in the to-be-processed picture, a damaged component in the vehicle components can be further identified. In an implementation of this embodiment, the component region and the damage region obtained by calculation through the foregoing identification process can be further analyzed to position the damaged component. Specifically, the damaged component can be identified based on a position region of the damage region and the component region in the to-be-processed picture. For example, in a picture P1, if the damage region identified in P1 is included in the area of the component region identified in P1 (generally, the area of the identified component region is larger than the area of the damage region), the vehicle component corresponding to the component region in P1 can be considered as a damaged component. Alternatively, in a picture P2, if the area of the damage region identified in P2 and the area of the component region identified in P2 have an overlap, the vehicle component corresponding to the component region in P2 can also be considered as a damaged component. Therefore, in a specific implementation provided in another embodiment of the present application, the determining a damaged component in the to-be-processed picture according to the damaged part and the component region may include:

S401. Query, in the component region range, whether there is a damage region of the damaged part; and if yes, determine that a vehicle component corresponding to the component region is the damaged component.

In a specific example, for example, in a picture P, the vehicle components are identified as a front left door and a front left fender in S2, component regions of the two vehicle components respectively located in the picture P at (r1, r2), corresponding to confidence levels (p1, p2). It is identified in S3 that a mild scratch (one of the damage types) exists in the picture P, the damage region of the mild scratch in the picture P is r3, and the confidence level of the mild scratch is p3. After processing the correspondence of the picture location region, the mild scratch region r3 is identified in the component region r1 of the front left door. Therefore, it is identified that the damaged component is the front left door, and the damage region of the damaged component is r3. The damage type of the damaged component in the single picture P is a mild scratch, and a confidence level is p1*p3.

Certainly, if it is also identified that the front left fender is damaged, based on the foregoing example, it can be determined that the damaged components in the picture P further include the front left fender and a damaged part and a damage type of the front left fender can also be calculated.

During loss assessment processing, the to-be-processed picture is the input to the disposed convolutional neural network. If a plurality of damaged parts exist, a plurality of picture regions including the damaged parts are identified, the picture region is examined, the damage type of the picture region is determined, and the damaged part and the damage type corresponding to each picture region are separately output. Further, in this embodiment, a damaged part corresponding to the damage type with the highest damage degree in the damage type can be selected as the damaged part of the damaged component. Correspondingly, the damage type with the highest damage degree is determined as the damage type of the damaged component.

S5. Generate a maintenance plan based on information including the damaged component, the damaged part, and the damage type.

After obtaining the information for vehicle loss assessment in this embodiment by identifying the vehicle component in the to-be-processed picture, determining the damaged component, identifying the damaged part and the damage type, etc., a maintenance plan can be generated based on the information. The maintenance plan can be a result of loss assessment in which one damaged component corresponds to one maintenance plan, or can be a result of loss assessment for a plurality of damaged components of the entire vehicle.

In this embodiment, each damage type can be set to correspond to one maintenance plan. For example, severe deformation corresponds to component replacement, mild deformation requires metal plating, and a mild scratch requires paint spraying. For a user, a final output for a damaged component may be a maintenance plan. In response to identifying a plurality of damaged parts in one damaged component, a maintenance solution for the part that is most severely damaged can be used as a final processing solution for the entire component. Generally, one component of a vehicle is considered as a whole. If a plurality of parts is damaged, it is relatively reasonable to apply the processing solution for the part that is most severely damaged. In this embodiment, a maintenance plan can be selected to resolve all damages of the damaged component. For example, in a damaged component, the damage type of a damaged part is severe damage, and the damaged part requires component replacement; and the damage type of another damaged part is moderate deformation, and the damaged part requires metal plating. In this case, component replacement processing can be selected instead of metal plating processing.

It should be understood that, generally, the loss assessment can include two pieces of information: damage assessment and cost assessment. In this embodiment of the present application, if the output maintenance plan does not include information about maintenance costs, the maintenance plan can be classified into the damage assessment part. If the maintenance plan includes information about maintenance costs, it can be considered that calculation processing is performed on both damage assessment and price assessment. Therefore, the maintenance plan described in this embodiment is a processing result of the maintenance plan of the vehicle loss assessment.

In a specific example, after the algorithm server identifies the damaged component, the damaged part of the damaged component, and the damage type in the to-be-processed picture, the algorithm server can generate the maintenance plan of the vehicle component based on the foregoing information according to a predetermined processing rule. For example, a front left fender of a B1 model vehicle in 2016 manufactured by an A1 manufacturer is in mild deformation, and therefore, requires metal plating processing. A front left door of a B2 model vehicle in 2010 manufactured by an A2 manufacturer is severely scratched and in severe deformation, and therefore, requires component replacement processing. A front bumper of a B3 model vehicle in 2013 manufactured by an A3 manufacturer is mildly scratched, and therefore, requires paint spraying. A front left lamp requires disassembling for examination, etc.

In another embodiment of the method in the present application, to satisfy a requirement of a user for cost information in the vehicle loss assessment, the maintenance plan may further include information about estimated modification costs for vehicle component maintenance, so that the user can know modification cost information and select a more suitable maintenance processing manner. Therefore, a user requirement is satisfied, and user experience is improved. Therefore, in another embodiment of the method in the present application, the method can further include:

S500. Acquire information about a maintenance strategy of the vehicle component.

Correspondingly, the maintenance plan can further include estimated maintenance costs corresponding to the maintenance strategy. The estimated maintenance costs are estimated maintenance costs of the vehicle component that are calculated based on the information including the damaged part of the vehicle component, the damage type, and the maintenance strategy, and data including a product price corresponding to the vehicle component in the maintenance strategy and/or a price for a maintenance service corresponding to the vehicle component in the maintenance strategy.

Figure 4:
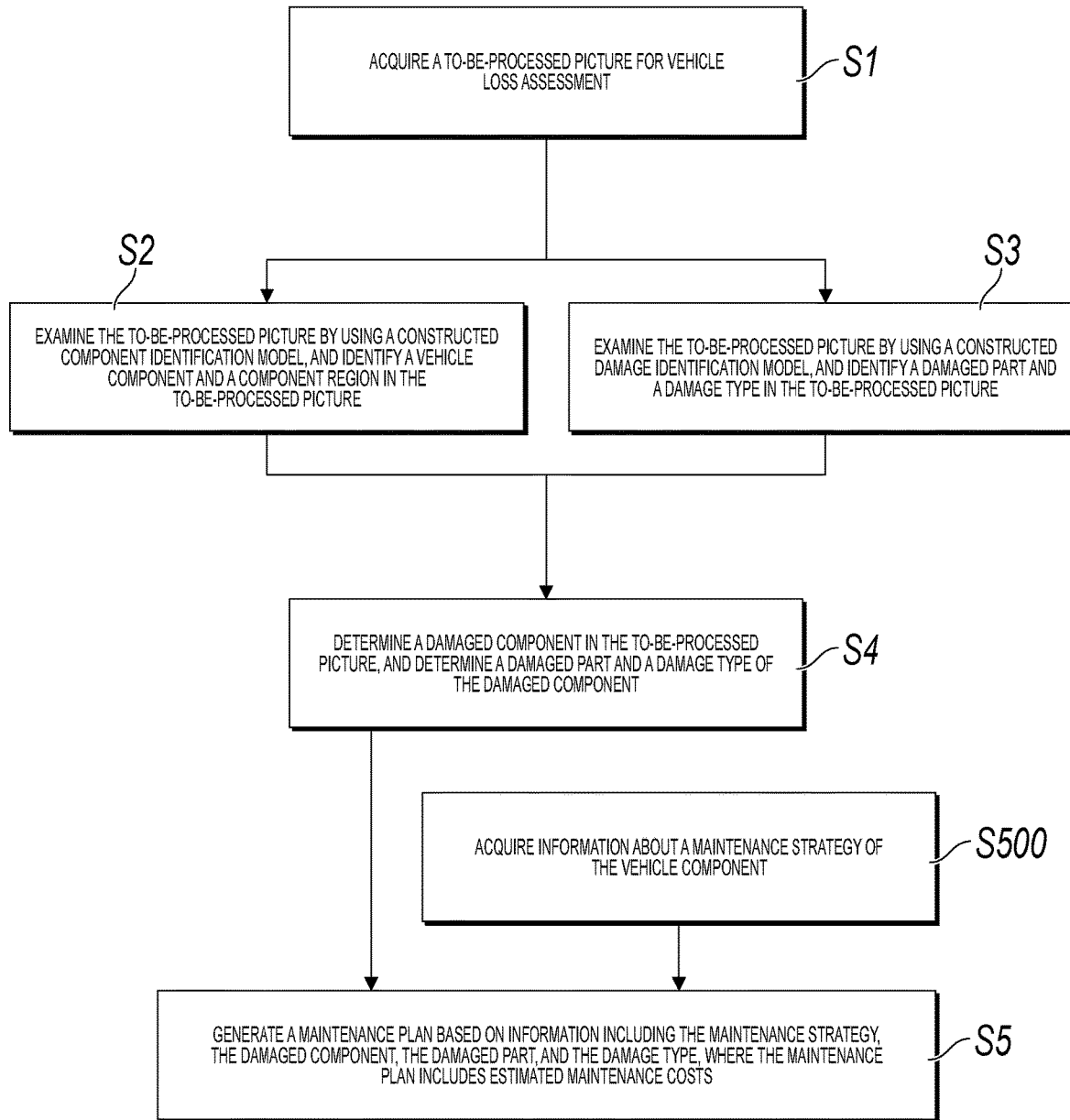
FIG. 4 is a schematic method flowchart illustrating a picture-based vehicle loss assessment method according to another embodiment of the present application.

FIG. 4 is a schematic method flowchart illustrating the method according to another embodiment of the present application. In a specific implementation, a calculation rule can be designed to invoke different price databases based on information about the maintenance strategy such as a vehicle model of the vehicle component, a selected maintenance place for the vehicle component, and a selected repair shop (whether an authorized dealership or a common general repair shop) for the vehicle component. Therefore, a maintenance plan for the vehicle component that includes a pre-maintenance processing solution and corresponding estimated maintenance costs is generated. The information about the maintenance strategy can be determined based on user's selection. For example, the user can select a maintenance place (for example, at a municipal level or a district level), select an authorized dealership or a general repair shop, and input a vehicle brand and a model. Then, the algorithm server can obtain the following maintenance plan according to the information about the maintenance strategy of the vehicle component, the identified damaged part, and the damage type.

A front bumper of a B3 model vehicle in 2013 manufactured by an A3 manufacturer is mildly scratched, and therefore, requires paint spraying. Estimated maintenance costs in a local authorized dealership are 600 RMB.

Certainly, in other implementations, an engine module can be established based on information such as working hours and costs of repair in the authorized dealership and information prepared by a conventional auto insurance company according to claims settlement experience, such as a damaged component, a damage type, and a damage degree. When an actual processing application identifies the damaged part of the vehicle component and the damage type, the engine module can be invoked to output a loss assessment result of the vehicle component.

The information about the maintenance strategy described above can be modified and replaced. For example, the user can select the authorized dealership for maintenance. In this case, the selection corresponds to a maintenance strategy and a maintenance plan. If the user changes to the general repair shop for maintenance, the selection corresponds to another maintenance strategy and another maintenance plan.

Figure 5:
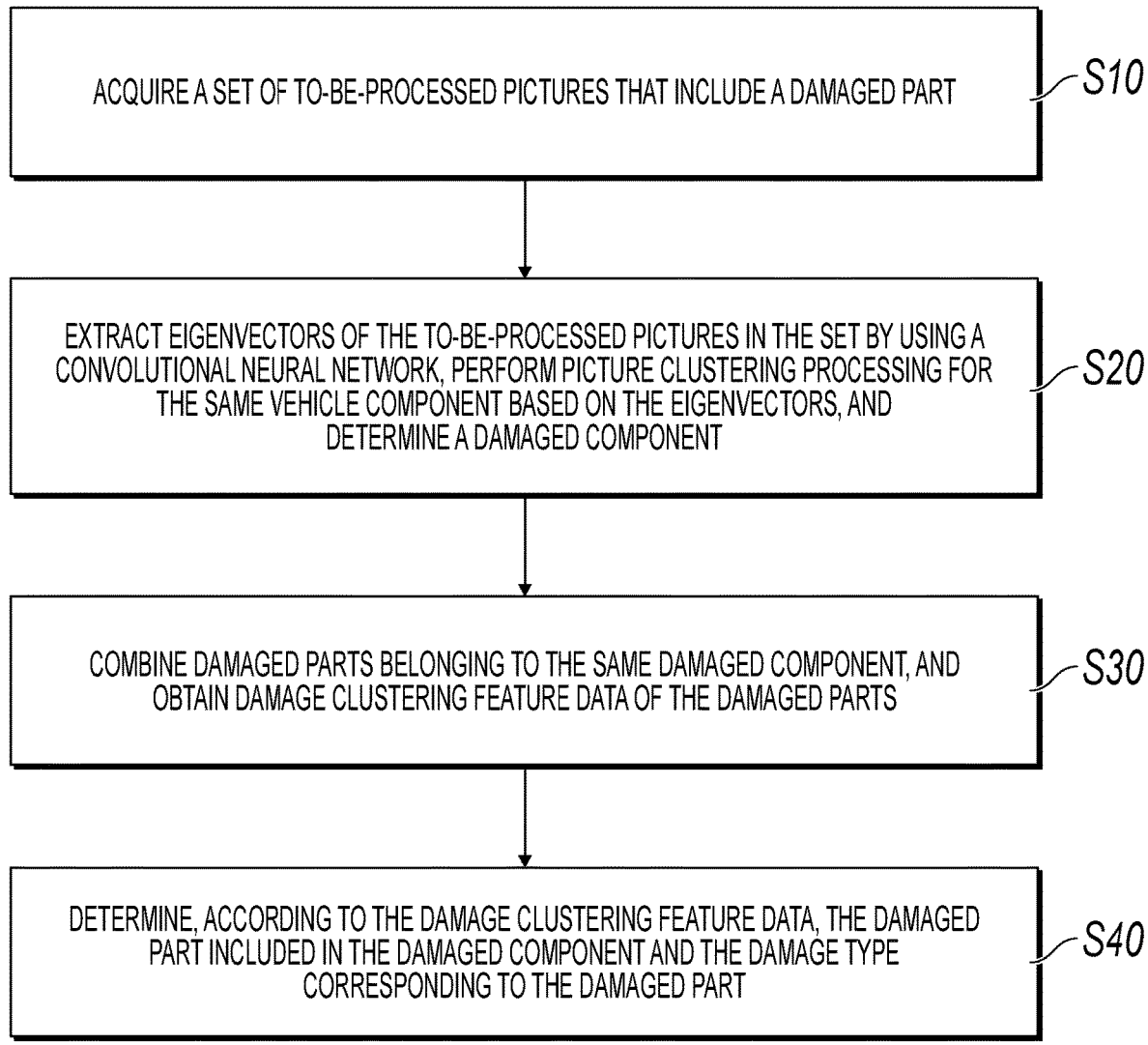
FIG. 5 is a schematic diagram illustrating an implementation process of determining a damaged component, a damaged part of the damaged component, and a damage type according to an embodiment of the present application.

The present application further provides a specific implementation of training the damage identification model based on samples. In another embodiment of the specific method, as shown in FIG. 5, the damaged component, the damaged part of the damaged component, and the damage type can be determined in the following manner:

S10. Acquire a set of to-be-processed pictures that include a damaged part.

S20. Extract feature vectors of the to-be-processed pictures in the set by using a convolutional neural network, perform picture clustering processing for the same vehicle component based on the feature vectors, and determine a damaged component.

S30. Combine damaged parts belonging to the same damaged component, and acquire damage clustering feature data of the damaged parts.

S40. Determine, according to the damage clustering feature data, the damaged part included in the damaged component and the damage type corresponding to the damaged part.

In a specific example, any identified damaged component p corresponds to one or more damaged parts (including the damage type, a position, and a confidence level) identified in one or more pictures. These pictures are clustered. The feature vectors extracted from the pictures by a convolutional network are used, for example, an output vector of the last damage sample picture input for model training in the convolutional network in the Ns is used, to calculate a picture distance. The damaged parts in pictures belong to the same cluster t are combined (top-K pictures are selected based on confidence levels, and k can be 15) as a feature Ft. Further, features (Ft1, Ft2, . . . ) of top-C(C can be 5, the pictures are arranged based on the quantity of weighted damaged parts in the cluster, and a weighted value is a confidence level of the damaged part) in the cluster are selected as feature input to a multiclass gradient boosting decision tree (GBDT). The multiclass gradient boosting decision tree (GBDT) model is used to finally output a damage type and a damage degree. This GBDT model can be obtained through gradient descent training by using marking data.

It can be understood that the damage picture can be a sample picture that is used when the model is being trained. In actual practice of a user, the damage picture can be the to-be-processed picture. The foregoing picture clustering is mainly clustering pictures that include the same component. A purpose of clustering is to identify pictures taken for parts of a roughly same damaged component. The damaged component in the to-be-processed picture, the corresponding damaged part, and the corresponding damage type are determined in the foregoing implementation based on the damaged components, the damaged parts, and the damage types obtained in S2 and S3.

Further, in another embodiment, the combining damaged parts belonging to the same damaged component can include: selecting and combining damaged parts in K to-be-processed pictures in descending order of confidence levels in to-be-processed pictures that belong to the same damaged component in a picture cluster, where K≥2.

After the combination, TOP K confidence levels are selected for processing. Especially, a speed of identification processing can be improved during training based on a large quantity of sample pictures. In an implementation scenario of model training in this embodiment, K can be in a range from 10 to 15.

In another embodiment, the acquiring damage clustering feature data of the damaged parts can include: selecting, from a combined picture cluster, damage clustering feature data of C to-be-processed pictures in descending order of weighted values of damaged parts, where C≥2, and a weight factor of the weighted value is a confidence level of the damaged part. In an implementation scenario of model training in this embodiment, C can be in a range from 3 to 5.

In some other embodiments, the determining, according to the damage clustering feature data, the damaged part included in the damaged component and the damage type corresponding to the damaged part includes: using the damage clustering feature data as input data for a specified multiclass gradient boosting decision tree model, and identifying the damaged part and the damage type.

It can be understood that the foregoing to-be-processed picture can be a sample picture that is used when the model is being trained. For example, in the obtained set of training sample pictures that include the damaged part in S10, or in training sample pictures that belong to the same damaged component in the picture cluster, the damaged parts in the K training sample pictures are selected in descending order of the confidence levels, and then combined. For an implementation process of the model training, refer to the description of the to-be-processed picture. Details are not described herein again.

In the foregoing implementation solution, reliability and accuracy of a result of the loss assessment processing can be improved, and a processing speed can be further improved.

Optionally, pictures are generated by drawing a three-dimensional model of a vehicle from a plurality of angles and in a plurality of illumination models with a sense of reality. Meanwhile, a position of each vehicle component in the picture is obtained. The pictures generated by means of drawing are added to the training data. Training is performed based on the pictures and the marking data. Therefore, in another embodiment, the training sample picture used by at least one of the component identification model or the damage identification model can include: picture information obtained by means of drawing of the damaged vehicle component generated by computer simulation.

According to the picture-based vehicle loss assessment method provided in the present application, the damaged components contained in the to-be-processed picture can be identified, and then the plurality of damaged parts of the damaged component and the damage type corresponding to each damaged part can be identified based on the constructed damage identification model. Therefore, vehicle loss assessment information of the vehicle component can be accurately, comprehensively, and reliably obtained. Further, the maintenance plan is generated for the vehicle based on the information including the damaged component, the damaged part of the damaged component, the damage type, and the maintenance strategy in the embodiments of the present application, to provide more accurate and reliable loss assessment information with practical reference value for insurance claim operator and a vehicle owner user. In the embodiments of the present application, one or more damaged components in one or more pictures, one or more damaged parts in the damaged components, and one or more damage degrees can be identified to quickly obtain more comprehensive and accurate loss assessment information. Then, the maintenance plan can be automatically generated, to satisfy a requirement of the insurance company or the vehicle owner user for fast, comprehensive, accurate, and reliable vehicle loss assessment processing, improving the accuracy and reliability of vehicle loss assessment processing, and improving user experience.

Figure 6:
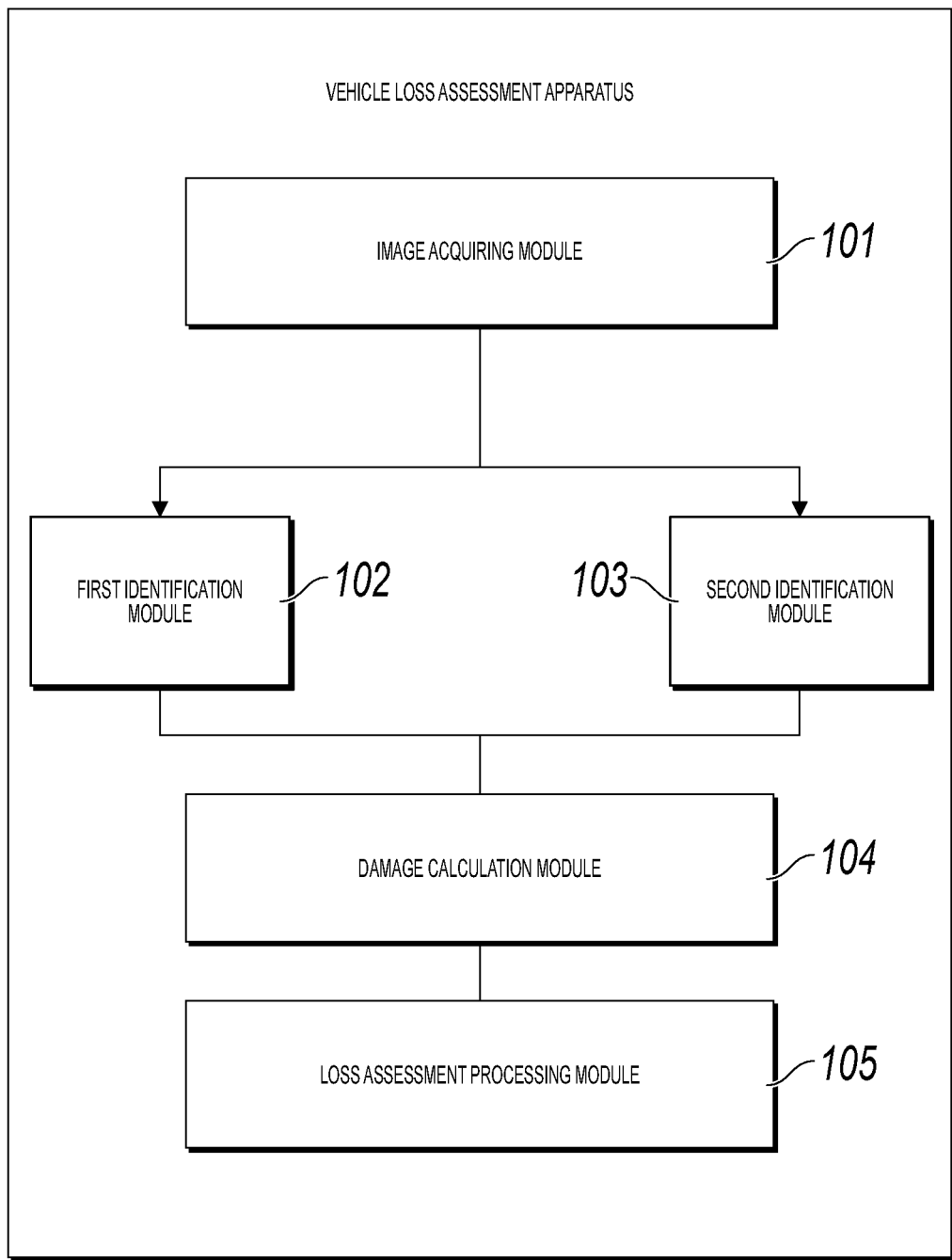
FIG. 6 is a schematic diagram illustrating a model structure of a picture-based vehicle loss assessment apparatus according to an embodiment of the present application.

Based on the foregoing picture-based vehicle loss assessment method, the present application further provides a picture-based vehicle loss assessment apparatus. The apparatus can be an apparatus that uses a system (including a distributed system), software (application), a module, a component, a server, a client, etc., using the method in the present application and that includes necessary implementation hardware. Based on the same inventive concept, the apparatus in an embodiment provided in the present application is described in the following embodiment. An implementation solution of the apparatus to resolve a problem is similar to the implementation solution of the method. Therefore, for a specific implementation of the apparatus in the present application, refer to the implementation of the foregoing method. Details are not described herein again. In the following, the term "unit" or "module" can implement a combination of software and/or hardware of a predetermined function. Although the apparatus described in the following embodiments is preferably implemented by software, it is also possible to implement the apparatus through hardware or a combination of software and hardware. Specifically, FIG. 6 is a schematic diagram illustrating a model structure of a picture-based vehicle loss assessment apparatus according to an embodiment of the present application. As shown in FIG. 6, the apparatus can include: a picture acquiring module 101, which can be configured to acquire a to-be-processed picture for vehicle loss assessment; a first identification module 102, which can be configured to: examine the to-be-processed picture by using a constructed component identification model, identify a vehicle component in the to-be-processed picture, and determine a component region of the vehicle component in the to-be-processed picture; a second identification module 103, which can be configured to: examine the to-be-processed picture by using a constructed damage identification model, and identify a damaged part and a damage type in the to-be-processed picture; a damage calculation module 104, which can be configured to: determine a damaged component in the to-be-processed picture based on a processing result of the first identification module 102 and a processing result of the second identification module 103, and determine a damaged part and a damage type of the damaged component; and a loss assessment processing module 105, which can be configured to: generate a maintenance plan based on information including the damaged component, the damaged part, and the damage type.

Referring to the foregoing method, the apparatus can further include other implementations. For example, the damage identification model can be a deep neural network that is based on a network model of a convolution layer and a region proposal layer and constructed after training based on sample data. Alternatively, the apparatus can further include a maintenance strategy acquiring module, or the loss assessment processing module 105 can be directly used to acquire information about a maintenance strategy for the vehicle component, and generate the maintenance plan that includes estimated maintenance costs. For details, refer to related descriptions in the foregoing method embodiments. Details are not described herein.

The method or the apparatus described in the present application can be implemented through a computer program and necessary hardware, and can be disposed in an application of a device for fast and reliably outputting the result of the picture-based vehicle loss assessment. Therefore, the present application further provides a picture-based vehicle loss assessment apparatus. The apparatus can be used on a server side, and can include a processor and a memory configured to store a processor executable instruction. When executing the instruction, the processor implements: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

In practice, the foregoing apparatus can further include other processing hardware such as a GPU (Graphics Processing Unit). For the foregoing method, in another embodiment of the apparatus, when executing the instruction, the processor can further implement: acquiring information about a maintenance strategy of the damaged component.

Correspondingly, the maintenance plan further includes estimated maintenance costs corresponding to the maintenance strategy, where the estimated maintenance costs are estimated maintenance costs of the damaged component that are calculated based on the information including the damaged component, the damaged part, the damage type, and the maintenance strategy, and data including a product price corresponding to the damaged component in the maintenance strategy and/or a price for a maintenance service corresponding to the damaged component in the maintenance strategy.

In another embodiment of the apparatus, an instruction for the constructed damage identification algorithm can include an algorithm processing instruction of a deep neural network that is based on a network model of a convolution layer and a region proposal layer and constructed after training based on sample data.

In another embodiment of the apparatus, when executing the instruction, the processor determines the damaged component, the damaged part of the damaged component, and the damage type in the following manner: acquiring a set of to-be-processed pictures that include the damaged part; extracting feature vectors of the to-be-processed pictures in the set by using a convolutional neural network, performing picture clustering processing for a same vehicle component based on the feature vectors, and determining the damaged component; combining the damaged parts belonging to a same damaged component, and acquiring damage clustering feature data of the damaged parts; and determining, according to the damage clustering feature data, the damaged part included in the damaged component and the damage type corresponding to the damaged part.

The picture-based vehicle loss assessment apparatus provided in this embodiment of the present application can be used to identify the damaged component included in the to-be-processed picture, and then identify the plurality of damaged parts of the damage component and the damage type corresponding to each damaged part based on the constructed damage identification model. Therefore, vehicle loss assessment information of the vehicle component can be accurately, comprehensively, and reliably obtained. Further, a maintenance plan is generated for the vehicle based on the information including the damaged component, the damaged part of the damaged component, the damage type, and the maintenance strategy in the embodiments of the present application, to provide more accurate and reliable loss assessment information with practical reference value for insurance claim operator and a vehicle owner user. In the embodiments of the present application, one or more damaged components in one or more pictures, one or more damaged parts in the damaged components, and one or more damage degrees can be identified to quickly obtain more comprehensive and accurate loss assessment information. Then, the maintenance plan can be automatically generated, to satisfy a requirement of the insurance company or the vehicle owner user for fast, comprehensive, accurate, and reliable vehicle loss assessment processing, improving the accuracy and reliability of vehicle loss assessment processing, and improving user experience.

The method or the apparatus in the foregoing embodiment of the present application can implement service logic, and record the service logic on a storage medium by using a computer program. The storage medium can be read and executed by a computer, so as to achieve the effect of the solution described in this embodiment of the present application. Therefore, the present application further provides a computer-readable storage medium. The computer-readable storage medium stores a computer instruction. When the instruction is executed, the following steps are implemented: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

The computer-readable storage medium can include a physical apparatus for storing information. Generally, information is digitalized and then stored in a medium in an electrical manner, a magnetometric manner, an optical manner, etc. The computer-readable storage medium described in this embodiment can include: an apparatus that stores information in an electrical manner, for example, a memory such as a RAM or a ROM; an apparatus that stores information in a magnetometric manner, such as a hard disk, a floppy disk, a magnetic tape, a magnetic core memory, a magnetic bubble memory, or a USB flash drive; an apparatus that stores information in an optical manner, such as a CD or a DVD. Certainly, further, there are other forms of readable storage media, for example, a quantum memory and a graphene memory.

Figure 7:
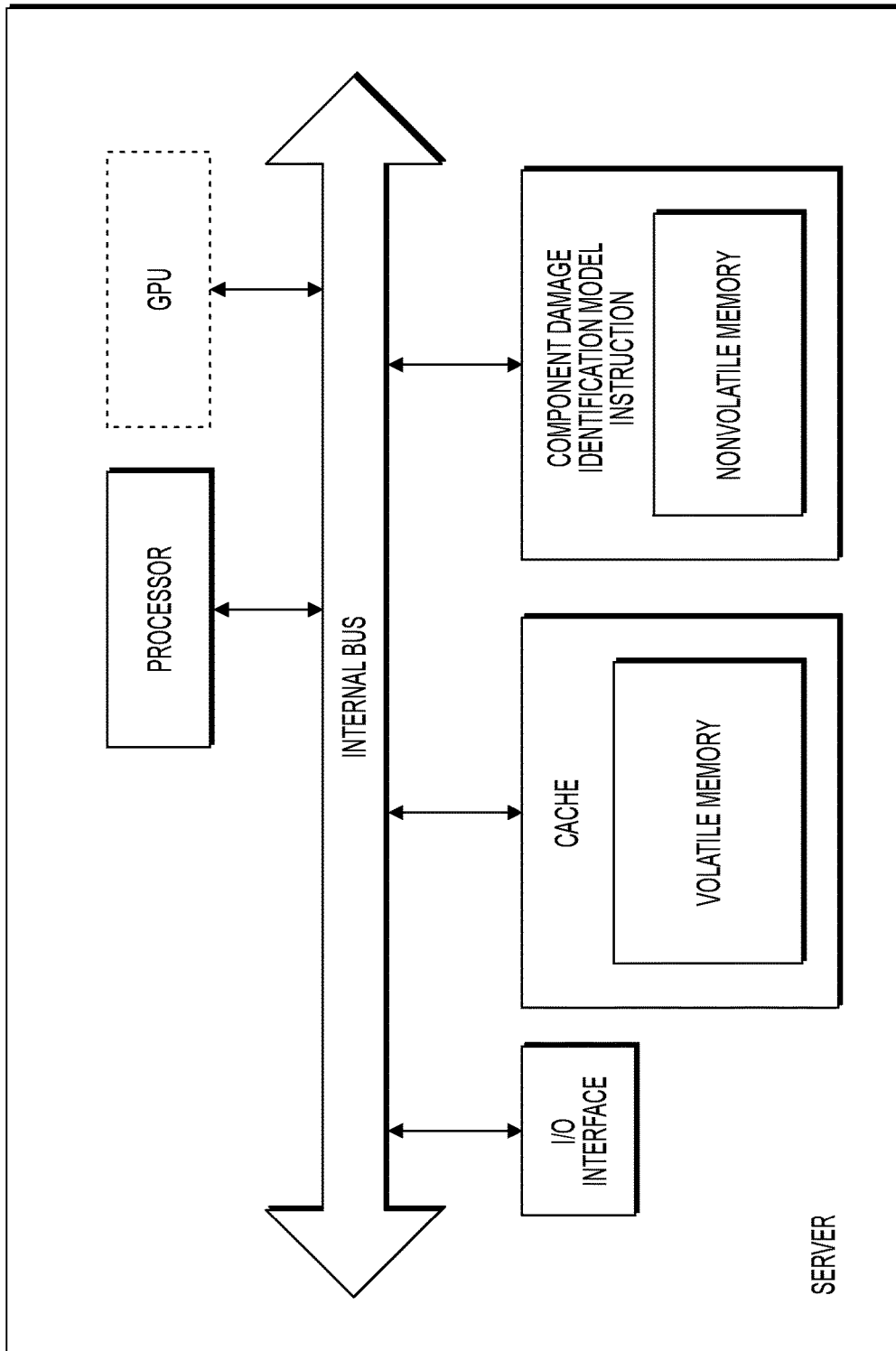
FIG. 7 is a schematic structural diagram illustrating an electronic device according to an embodiment of the present application.

The foregoing apparatus or method can be applied to an electronic device for picture processing, so as to implement fast processing of picture-based vehicle loss assessment. The electronic device may be a standalone server, or may be a system cluster including a plurality of application servers, or may be a server in a distributed system. FIG. 7 is a schematic structural diagram illustrating an electronic device according to an embodiment of the present application. In an embodiment, the electronic device can include a processor and a memory configured to store a processor executable instruction. When executing the instruction, the processor implements: acquiring a to-be-processed picture for vehicle loss assessment; examining the to-be-processed picture by using a constructed component identification algorithm, identifying a vehicle component in the to-be-processed picture, and determining a component region of the vehicle component in the to-be-processed picture; examining the to-be-processed picture by using a constructed damage identification algorithm, and identifying a damaged part and a damage type in the to-be-processed picture; determining a damaged component in the to-be-processed picture according to the damaged part and the component region, and determining a damaged part and a damage type of the damaged component; and generating a maintenance plan based on information including the damaged component, the damaged part, and the damage type.

Figure 8:
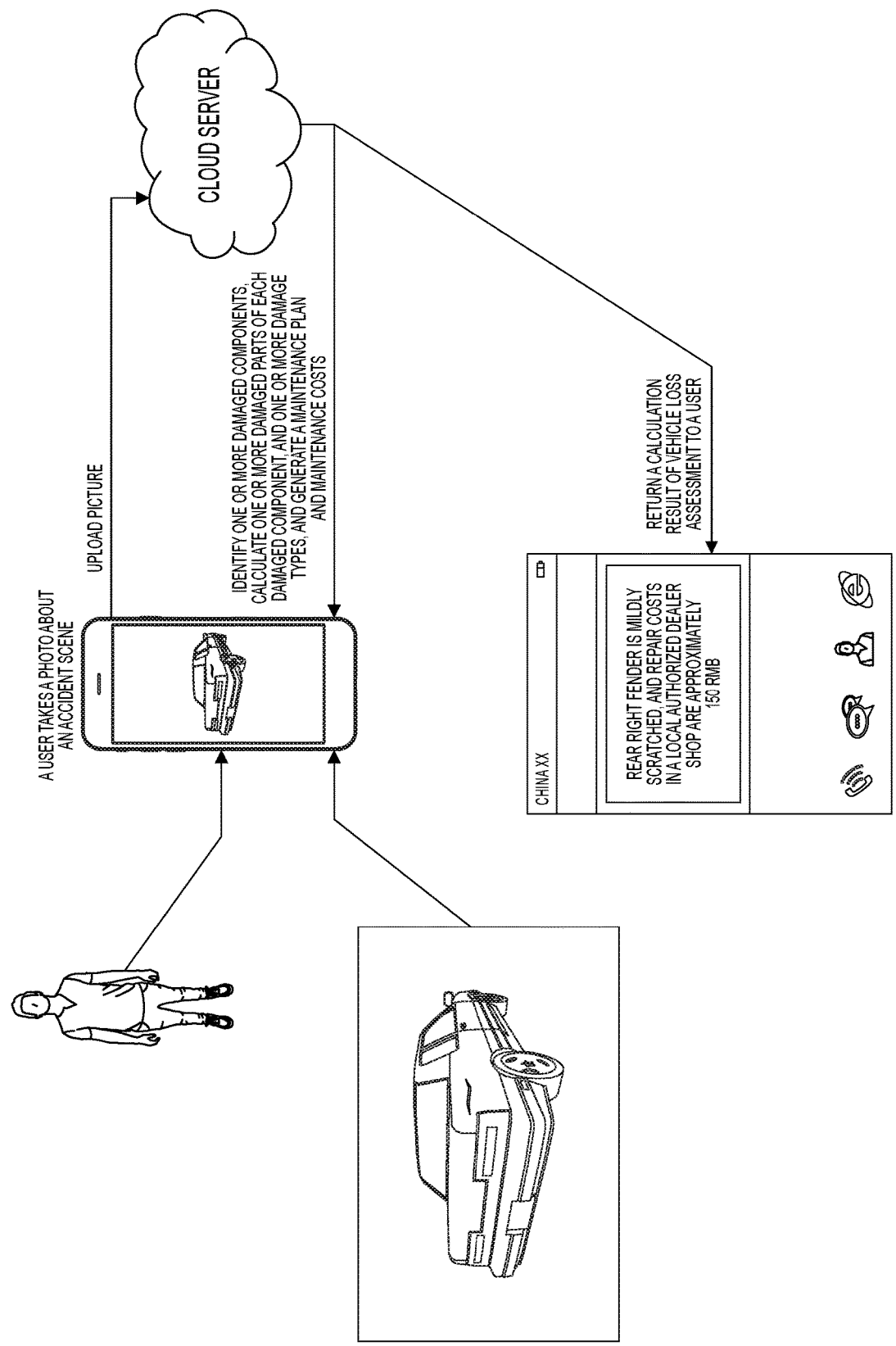
FIG. 8 is a schematic diagram illustrating a processing scenario of vehicle loss assessment according to an embodiment of the present application.

FIG. 8 is a schematic diagram illustrating a processing scenario of vehicle loss assessment according to an embodiment of the present application. A client in FIG. 8 is a mobile terminal of a user. The client in another implementation scenario can be a PC or another terminal device. According to the picture-based vehicle loss assessment method and apparatus, and the electronic device provided in the present application, a damaged part and a damage type are identified by using a deep learning technology, and the damaged part is accurately positioned by using a picture matching method. Therefore, accuracy of loss assessment can be improved based on a result of multi-picture identification. A maintenance plan and estimated costs are automatically generated based on a picture identification technology, a vehicle component price database, and a maintenance rule. In some embodiments of the present application, the maintenance plan and the estimated maintenance costs can be automatically generated based on more specific vehicle damage information, the vehicle component price database, maintenance processing manner, etc. Therefore, a requirement of an insurance company or a vehicle owner user for fast, comprehensive, accurate, and reliable vehicle loss assessment processing can be satisfied, thereby improving accuracy and reliability of a result of vehicle loss assessment processing and improving user experience.

It should be noted that although the foregoing embodiments provide description in embodiments of an apparatus, an electronic device, and a computer-readable storage medium, the apparatus, the electronic device, and the computer-readable storage medium can further include another implementation based on the description of related method or apparatus embodiment. For details, refer to the description of the related method or the apparatus embodiment. Details are not described herein again.

The content of the present application mentions descriptions of data model construction, data acquiring, interaction, calculation, determining, etc. in picture quality processing, a deep neural network generated based on a convolutional neural network, a region proposal network, and a combination thereof, a calculation manner of estimated maintenance costs, a processing manner of acquiring a damaged part and a damage type through a GBDT model, etc. However, the present application is not limited to the cases that must comply with an industrial communications standard, a standard data model, computer processing and storage rules, or situations described in the embodiments of the present application. Some industrial standards, a self-defined manner, or an implementation solution obtained after modification based on an implementation described in the embodiments can also implement the same, equivalent, similar, or expectable implementation effects of a variant as the foregoing embodiments. The embodiments of a data acquiring manner, a storage manner, a manner of determining, a processing manner, etc. in modifications or variations can still fall within the scope of the optional implementation solutions of the present application.

In the 1990s, improvement of a technology can be clearly distinguished between hardware improvement (for example, improvement of circuit structures such as a diode, a transistor, and a switch) and software improvement (improvement of a method procedure). However, with the development of technologies, improvement of many method procedures can be considered as a direct improvement of a hardware circuit structure. Designers developed an improved method procedure for a hardware circuit, to obtain a corresponding hardware circuit structure. Therefore, it cannot be said that an improvement of a method procedure cannot be implemented by using a hardware entity module. For example, a programmable logic device (PLD) (for example, a field programmable gate array (FPGA)) is a type of an integrated circuit. A logical function of the programmable logic device is determined by component programming executed by a user. The designers perform programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specified programming language, which is referred to as hardware description language (HDL). There is more than one type of HDL, such as an Advanced Boolean Expression Language (ABEL), an Altera Hardware Description Language (AHDL), Confluence, a Cornell University Programming Language (CUPL), an HDCal, a Java Hardware Description Language (JHDL), a Lava, a Lola, a MyHDL, a PALASM, and an RHDL (Ruby Hardware Description Language). Currently, Very-High-Speed Integrated Circuit Hardware Description Language (VHDL) and Verilog are most commonly used. A person skilled in the art should also understand that a method procedure only needs to be logically programmed, and programmed to the integrated circuit by using the foregoing hardware description languages, so that a hardware circuit that implements the logical method procedure can be easily obtained.

The controller can be implemented in any suitable manner. For example, the controller can be a microprocessor, a processor, a computer-readable medium storing computer-readable program code (for example, software or firmware) that can be executed by a (micro) processor, a logic gate, a switch, an application-specific integrated circuit (ASIC), a programmable logic controller, or an embedded microcontroller. Examples of the controller include, but are not limited to the following microcontrollers: ARC 625D, Atmel AT91SAM, Microchip PIC18F26K20, and Silicone Labs C8051F320. The memory controller may also be implemented as a part of the control logic of the memory. A person skilled in the art also knows that a controller can be implemented in a manner of pure computer-readable program code, and the steps in the method can be logically programmed to enable the controller to further implement same functions in forms of a logical gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in a hardware component.

The system, the apparatus, the module, or the unit described in the foregoing embodiment can be specifically implemented by a computer chip or an entity, or implemented by a product with a specified function. A typical implementation device is a computer. Specifically, the computer may be, for example, a personal computer, a laptop computer, an in-vehicle human-machine interaction device, a cellular phone, a camera phone, a smartphone, a personal digital assistant, a media player, a navigation device, an email device, a game console, a tablet computer, a wearable device, or a combination of any of these devices.

Although the present application provides the operational steps of the method in an embodiment or a flowchart, more or fewer operational steps can be included based on the conventional or non-creative means. The sequence of steps enumerated in the embodiments is merely one of a plurality of step execution sequences, and does not represent a unique execution sequence. In practice, when an apparatus or a terminal product executes steps, the execution can be performed in a sequence shown in an embodiment or a method shown in the accompanying drawing, or performed in parallel (for example, in an environment of processing in parallel, in a multithreaded processing environment, and even in a distributed data processing environment). The terms "comprise", "include", or their any other variants are intended to cover a non-exclusive inclusion, so that a process, a method, an article, or a device that includes a list of elements not only includes those elements, but also includes other elements which are not expressly listed, or further includes elements inherent to such process, method, article, or device. When there are no more restrictions, it is also possible that there is another same or equivalent element in the process, the method, a product, or a device that includes the element.

For ease of description, the foregoing apparatus is described by dividing the functions into various modules. Certainly, when implementing the present application, a function of each module can be implemented in one or more pieces of software and/or hardware, or a module that implements the same function can be implemented as a combination of a plurality of submodules or subunits. The described apparatus embodiment is merely exemplary. For example, the unit division is merely logical function division and can be other division in actual implementation. For example, a plurality of units or components may be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that a controller can be implemented in a manner of pure computer-readable program code, and the steps in the method can be logically programmed to enable the controller to further implement same functions in forms of a logical gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in a hardware component.

The present invention is described with reference to the flowcharts and/or block diagrams of the method, the device (system), and the computer program product according to the embodiments of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions can be stored in a computer-readable memory that can instruct the computer or any other programmable data processing devices to work in a specific manner, so that the instructions stored in the computer-readable memory can generate an artifact that includes an instruction apparatus. The instruction apparatus implements a specific function in one or more procedures in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more procedures in the flowcharts and/or in one or more blocks in the block diagrams.

In a typical configuration, the computing device includes one or more processors (CPU), an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash memory). The memory is an example of the computer-readable medium.

The computer-readable medium includes persistent, non-persistent, movable, and unmovable media that may implement information storage by using any method or technology. Information may be a computer-readable instruction, a data structure, a program module, or other data. An example of a computer storage medium includes, but is not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that may be configured to store information that a computing device can access. As defined in this specification, the computer-readable medium does not include transitory computer-readable media (transitory media), such as a modulated data signal and a carrier.

A person skilled in the art should understand that the embodiments of the present application may be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including, but not limited to a disk memory, a CD-ROM, an optical memory, and the like) that include computer-usable program code.

The present application can be described in the general context of computer executable instructions executed by a computer, for example, a program module. Generally, the program module includes a routine, a program, an object, a component, a data structure, and the like for executing a particular task or implementing a particular abstract data type. The present application can also be practiced in distributed computing environments in which tasks are performed by remote processing devices that are connected by using a communications network. In a distributed computing environment, program modules can be positioned in both local and remote computer storage media including storage devices.

The embodiments in this specification are all described in a progressive manner, and the same or similar parts in the embodiments can refer to each other, and each embodiment focuses on a difference from other embodiments. Especially, since a system embodiment is similar to a method embodiment, therefore is described briefly; and for the relevant parts, reference can be made to partial descriptions of the method embodiment. In the description of this specification, reference terms such as "an embodiment", "some embodiments", "example", "specific example", and "some examples" mean that specific features, structures, materials, or features described with reference to the embodiment or the example are included in at least one embodiment or example in the present application. In this specification, the foregoing terms are described not necessarily for a same embodiment or example. In addition, the described specific features, structures, materials, or characteristics can be combined in a proper manner in any one or more embodiments or examples. Further, a person skilled in the art can combine different embodiments or examples descried in this specification and features of different embodiments or examples without mutual contradiction.

The foregoing descriptions are merely the embodiments of the present application, and are not intended to limit the present application. For a person skilled in the art, the present application can have various changes and variations. Any modifications, equivalent replacements, and improvements made within the spirit and principle of the present application shall fall within the scope of the claims in the present application.

Figure 9:
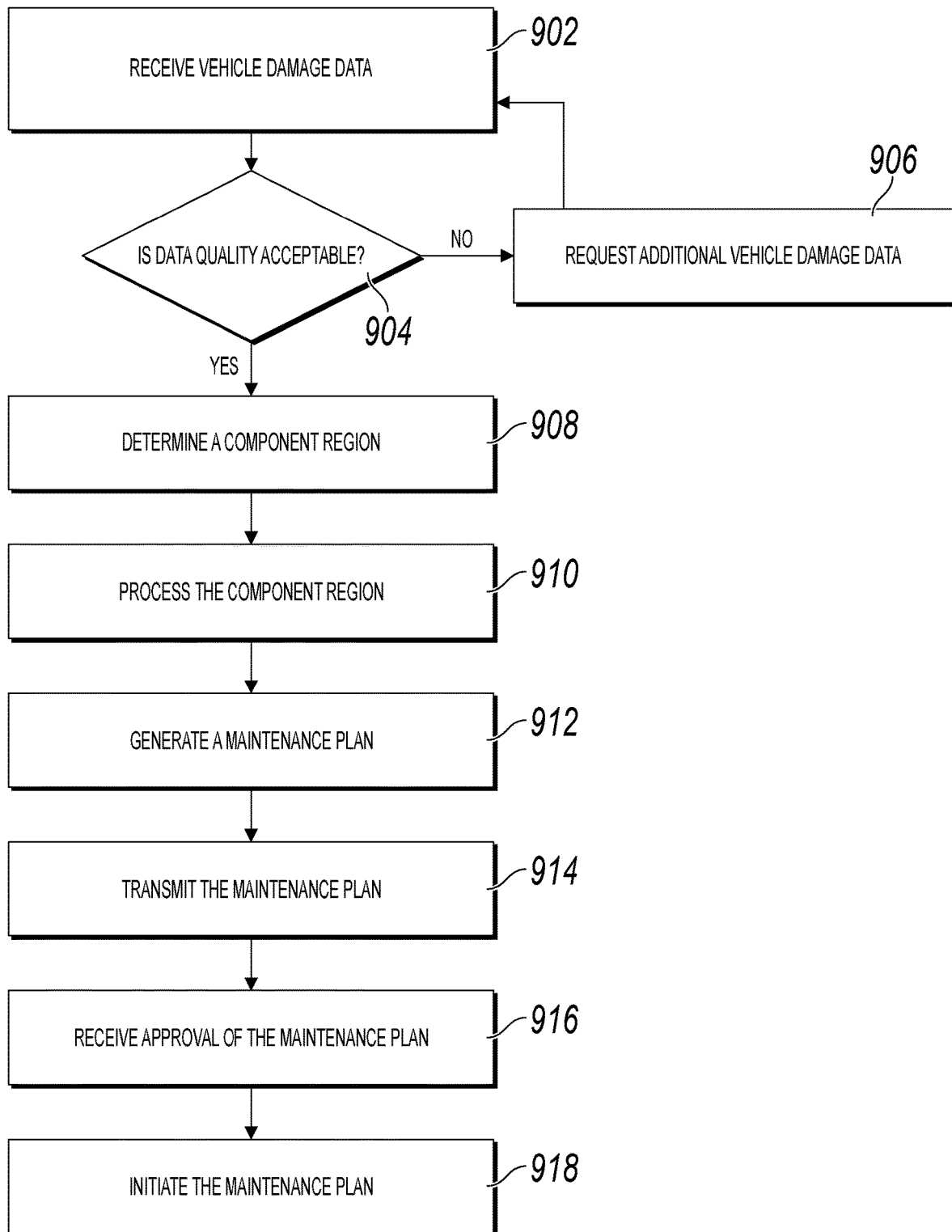
FIG. 9 is a flowchart illustrating an example of a computer-implemented method for vehicle loss assessment, according to an implementation of the present disclosure.

FIG. 9 is a flowchart illustrating an example of a computer-implemented method 900 for generating vehicle loss assessment, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, vehicle damage data is received. The vehicle can include any type of private or public vehicle, such as a car, a truck, a boat, a train, a helicopter, and/or an airplane. In some implementations, the vehicle damage data is received from a user, such as a vehicle operator or a vehicle owner. The vehicle operator can take one or more images (or images) of the damaged location of the vehicle by using a mobile device (such as a mobile phone) at an accident scene involving the damaged vehicle to receive information about loss or the damage assessment status. The vehicle operator can directly upload the images or transmit the images to the vehicle owner to upload them. For example, the user can access an application configured to support vehicle maintenance to upload the acquired images. The application can be configured to automatically process the images to minimize the amount of transmitted data to minimize bandwidth requirements. The image processing can include filtering the images to delete features (e.g., background features) that are irrelevant for damage identification. The image processing can include conversion to gray scale images to minimize transmission bandwidth requirements. The image processing can include compression to a predetermined file size to minimize transmission bandwidth requirements. In addition to the images, the user can provide a user identifier (e.g., name and a password) and data associated to the uploaded images. The data can include indication of the damaged auto part (e.g., a front bumper, a left front door, or a taillight of the vehicle), the vehicle owner, insurance information, insurance information of other parties associated to the damaged vehicle, accident conditions, location and time of accident. From 902, method 900 proceeds to 904.

At 904, vehicle damage data is processed to determine whether the data quality is acceptable and sufficient. The image quality may be determined based on a quality determination algorithm, such as a fuzzy degree threshold or an information entropy value. A poor image quality can prevent extraction of relevant information for vehicle loss assessment. If the vehicle damage data is below a quality threshold or portions of the vehicle damage data are missing, from 904, method 900 proceeds to 906.

At 906, additional vehicle damage data are requested from the user. For example, the user can be instructed to provide additional images that conform to particular standards that enable image processing. In some implementations, the user can be instructed to provide additional data associated to the uploaded images. From 906, method 900 returns to 902. If the vehicle damage data is above the quality threshold, from 904, method 900 proceeds to 908.

At 908, the received vehicle damage data is used to retrieve user information based on the user identifier and processed with the vehicle images to determine a component region. The vehicle image can be processed using one or more image parsing techniques and pattern matching techniques to separate a component region from other regions of the vehicle that are not damaged. The component region includes a portion of the vehicle image corresponding to a part of the vehicle that is damaged on the vehicle. A damaged vehicle part may include a plurality of damaged areas, and each damaged area corresponds to a component region. From 908, method 900 proceeds to 910.

At 910, the component region is processed to identify one or more damaged area locations and one or more damage types of the auto parts based on a particular model by using a constructed damage identification algorithm. The component identification model used to identify a vehicle component in an image can include a machine-learning algorithm. The component identification model can be trained on sample images to identify the vehicle components contained in the component image. Multiple component identification models can be used to determine the vehicle component. The output of each component identification model can include the vehicle component characterization and a confidence level. The component identification models can include a network model of a deep neural network, a variant network model, a convolutional neural network (CNN) model, a region proposal network (RPN) model or a combination of multiple models, as described with reference to FIGS. 1-8. The CNN can include a convolution layer and other structures, such as an activation layer, and is mainly used for damage identification in one or more images. CNN model can combine two-dimensional discrete convolution operations in image processing with an artificial neural network. The convolution operation can be used for automatic extraction a damage feature. The damage feature (which can be a two-dimensional feature extracted by using the convolutional neural network) extracted from an image (in any size) can be input to the RPN model for additional processing. The RPN model can process the damage feature to generate component characterization as a set of three-dimensional damage data sets (rectangular target proposal boxes). For example, a single damage image can include a plurality of damaged parts. Each three-dimensional damage data set can correspond to a particular damaged part of the plurality of damaged parts. If there is one damaged part, one image region is output; if there are k damaged parts, k image regions are output; or if there is no damaged part, zero image regions are output. Each three-dimensional damage data set includes a score (e.g., 1, 2, 3) to differentiate between mild, moderate and severe damages, to define damage classifications (the damage classification is used to determine a damage type), and confidence levels (the confidence level herein is a parameter indicating a degree of authenticity of a damage type). The damage type can include mild scratching, severe scratching, mild deformation, moderate deformation, severe deformation, damage, and disassembling-required check.

In some implementations, the component regions can be processed to extract one or more feature vectors. Image clustering can be performed for the same vehicle component based on the feature vectors, to characterize the damaged component. The damaged parts corresponding to the same damaged component can be combined and damage clustering feature data can be acquired for the damaged parts. The damage clustering feature data can be used to determine the damaged part included in the damaged component and the damage type corresponding to the damaged part. For example, any identified damaged component p corresponding to one or more damaged parts (including the damage type, a position, and a confidence level) can be identified in one or more images that can be clustered. A feature vector corresponding to a damage image processed by the component identification model (CNN model) can be used to calculate an image distance. The damaged parts corresponding to the same cluster t can be combined as a feature Ft. Multiple features (Ft1, Ft2, . . . ) of top-C images (images selected based on the quantity of weighted damaged parts in the cluster, and a weighted value is a confidence level of the damaged part) in the cluster can be selected as feature input to a multiclass gradient boosting decision tree (GBDT). The GBDT model is used to output a damage type and a damage degree. The GBDT model can be obtained through gradient descent training by using marking data. The purpose of clustering is to identify images taken for parts of a roughly same damaged component. The damaged component in the to-be-processed image, the corresponding damaged part, and the corresponding damage type are determined based on the damaged components, the damaged parts, and the damage types. Combining damaged parts belonging to the same damaged component can include: selecting and combining damaged parts in multiple images corresponding to the same damaged component in an image cluster, in descending order of confidence levels (weighted values of damaged parts). The processing speed can be improved by decreasing the number of processed images based on the confidence levels. For example, a maximum number of images with a confidence level equal or higher than a preselected confidence level can be used to control the processing load and consequently the processing speed. From 910, method 900 proceeds to 912.

At 912, a maintenance plan is generated based on the identified damaged area locations and damage types. The maintenance plan is included in the vehicle loss assessment. The maintenance plan can be generated using a rule engine. The rule engine can invoke different pricing scheme databases based on a maintenance strategy associated to the vehicle model, location, and available repair shops, to generate, based on a set of rules, at least one maintenance plan for the damaged vehicle part including the maintenance services that can remedy the identified damage. The rules can include front-end rules and back-end rules. The front-end rules can indicate contract requirements, such as a minimum type of information type necessary to determine a maintenance plan. These contract-based features may include labor rates, chargeable hours per particular task, or any other aspect of the work covered by the maintenance plan. The back-end rules can indicate whether the maintenance plan aligns with the identified damage (e.g., in the case of a front-end collision, the system would flag a rear tail light assembly indicated as needing maintenance). In some cases, the maintenance plan includes maintenance cost estimates. If the output maintenance plan does not include maintenance costs, the maintenance plan can be classified as damage assessment part. If the maintenance plan includes maintenance costs, it can be considered that calculation processing is performed on both damage assessment and price assessment. The maintenance plan can include time estimates corresponding to possible maintenance services and locations. In some implementations, generating the maintenance plan includes transmitting assignment data one or more vehicle repair shops as part of the first notice of loss (FNOL) process to generate assignment estimates. Assignment data may include, but not be limited to, damage information, customer name, contact information, insurance claim number, assignment date, loss date, loss type, loss type detail, loss description, current vehicle location, location where vehicle may be sent, deductible amount, vehicle type, year/make/model, vehicle identification number (VIN), license plate number, towing company information, damage information, prior damage information, and vehicle safety status (drivable/non-drivable). From 912, method 900 proceeds to 914.

At 914, the maintenance plan is transmitted to the user and/or an insurer associated to the vehicle. The maintenance plan transmission can include generating a maintenance plan code interpretable by the application configured to support the vehicle maintenance. The plan code can be formatted to minimize the amount of transmitted data to minimize bandwidth requirements and to increase the speed of the visualization process. The application can be configured to generate an alert for the user to indicate that the maintenance plan is ready to be reviewed. The application can be configured to display the maintenance plan for the user of the mobile device on a graphical user interface of the application. From 914, method 900 proceeds to 916.

At 916, an approval of the maintenance plan can be received from the user and/or the insurer. The approval of the maintenance plan can indicate if the financial responsibility or the vehicle loss compensation is accepted by the user, the insurer, and/or a third party. The approval of the maintenance plan can include a selection of a maintenance shop and at least a portion of the possible maintenance services listed in the proposed maintenance plan. The approval of the maintenance plan can include a preferred timing to initiate the maintenance plan. From 916, method 900 proceeds to 918.

At 918, in response to receiving the approval of the maintenance plan, the maintenance plan is initiated. Initiating the maintenance plan can include transmitting work assignment data a selected vehicle maintenance shop to conduct maintenance operations. An advantage of communication with the vehicle maintenance shop is the ability to offer real-time updates when any of the information changes during the course of the claim and/or maintenance and may expedite the maintenance for the customer. After 918, method 900 stops.

The implementations of the present disclosure can improve corresponding data sharing efficiency, while reducing computing resources by minimizing the amount of transmitted data to minimize bandwidth requirements and to increase the speed of vehicle loss assessment generation process.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   receiving, at a cloud server and from a mobile device, an image of a damaged vehicle;
   analyzing, by the cloud server, the image of the damaged vehicle using a component identification model to identify a region of the image that includes a vehicle component, wherein the vehicle component comprises multiple parts;
   in parallel with analyzing the image of the damaged vehicle using the component identification model, analyzing, by the cloud server, the image of the damaged vehicle using a damage identification model to identify a region of the image that includes a damaged part, and a damage type indicated in the image;

determining that the region of the image that was identified by the damage identification model matches the region of the image that was identified by the component identification model;

in response to determining that the region of the image that was identified by the damage identification model matches the region of the image that was identified by the component identification model, generating, by the cloud server, a maintenance plan for the damaged vehicle based on the identified damage type; and transmitting, by the cloud server, the maintenance plan to the mobile device.

2. The method of claim 1, wherein the image of the damaged vehicle is analyzed by the component identification model only after determining that the image satisfies predetermined quality criteria.

3. The method of claim 1, wherein the component identification model further identifies a position of the identified region in the image.

4. The method of claim 1, wherein the component identification model is generated based on a convolutional neural network (CNN) and a region proposal network (RPN).

5. The method of claim 1, wherein the damage identification model is generated based on a convolutional neural network (CNN) and a region proposal network (RPN).

6. The method of claim 1, wherein the maintenance plan is generated for a the damaged part that has a most severe amount of damage.

7. The method of claim 1, wherein the maintenance plan includes estimated modification costs for maintenance of the vehicle component.

8. A non-transitory computer readable storage medium storing instructions executable by a data processing apparatus and upon such execution cause the data processing apparatus to perform operations comprising:

receiving, at a cloud server and from a mobile device, an image;

analyzing, by the cloud server, the image of a damaged vehicle using a component identification model to identify a region of the image that includes a vehicle component, wherein the vehicle component comprises multiple parts;

in parallel with analyzing the image of the damaged vehicle using the component identification model, analyzing, by the cloud server, the image of the damaged vehicle using a damage identification model to identify a region of the image that includes a damaged part, and a damage type indicated in the image;

determining that the region of the image that was identified by the damage identification model matches the region of the image that was identified by the component identification model;

in response to determining that the region of the image that was identified by the damage identification model matches the region of the image that was identified by the component identification model, generating, by the cloud server, a maintenance plan for the damaged vehicle based on the identified damage type; and transmitting, by the cloud server, the maintenance plan to the mobile device.

9. The medium of claim 8, wherein the image of the damaged vehicle is analyzed by the component identification model only after determining that the image satisfies predetermined quality criteria.

10. The medium of claim 8, wherein the component identification model further identifies a position of the identified region in the image.

11. The medium of claim 8, wherein the component identification model is generated based on a convolutional neural network (CNN) and a region proposal network (RPN).

12. The medium of claim 8, wherein the damage identification model is generated based on a convolutional neural network (CNN) and a region proposal network (RPN).

13. The medium of claim 8, wherein the maintenance plan is generated for a the damaged part that has a most severe amount of damage.

14. The medium of claim 8, wherein the maintenance plan includes estimated modification costs for maintenance of the vehicle component.

15. A system comprising:
one or more processing devices; and
one or more storage devices storing instructions that are executable by the one or more processing devices to perform operations comprising:

receiving, at a cloud server and from a mobile device, an image;

analyzing, by the cloud server, the image of a damaged vehicle using a component identification model to identify a region of the image that includes a vehicle component, wherein the vehicle component comprises multiple parts;

in parallel with analyzing the image of the damaged vehicle using the component identification model, analyzing, by the cloud server, the image of the damaged vehicle using a damage identification model to identify a region of the image that includes a damaged part, and a damage type indicated in the image;

determining that the region of the image that was identified by the damage identification model matches the region of the image that was identified by the component identification model;

in response to determining that the region of the image that was identified by the damage identification model matches the region of the image that was identified by the component identification model, generating, by the cloud server, a maintenance plan for the damaged vehicle based on the identified damage type; and transmitting, by the cloud server, the maintenance plan to the mobile device.

16. The system of claim 15, wherein the image of the damaged vehicle is analyzed by the component identification model only after determining that the image satisfies predetermined quality criteria.

17. The system of claim 15, wherein the component identification model further identifies a position of the identified region in the image.

18. The system of claim 15, wherein the component identification model is generated based on a convolutional neural network (CNN) and a region proposal network (RPN).

19. The system of claim 15, wherein the damage identification model is generated based on a convolutional neural network (CNN) and a region proposal network (RPN).

20. The system of claim 15, wherein the maintenance plan is generated for a the damaged part that has a most severe amount of damage.

* * * * *